(12) United States Patent
Zimmerman et al.

(10) Patent No.: US 7,529,193 B2
(45) Date of Patent: May 5, 2009

(54) METHOD AND APPARATUS FOR BANDWIDTH REQUEST/GRANT PROTOCOLS IN A WIRELESS COMMUNICATION SYSTEM

(75) Inventors: Ofer Zimmerman, Modiin (IL); Kenneth L. Stanwood, Cardiff by the Sea, CA (US); Yair Bourlas, San Diego, CA (US)

(73) Assignee: Wi-LAN, Inc., Ottawa, Ontario (CA)

( * ) Notice: Subject to any disclaimer, the term of this patent is extended or adjusted under 35 U.S.C. 154(b) by 704 days.

(21) Appl. No.: 10/978,903

(22) Filed: Nov. 1, 2004

(65) Prior Publication Data
US 2005/0089064 A1   Apr. 28, 2005

Related U.S. Application Data

(63) Continuation of application No. 09/783,671, filed on Feb. 14, 2001, now abandoned, which is a continuation-in-part of application No. 09/316,518, filed on May 21, 1999, now Pat. No. 6,925,068.

(51) Int. Cl.
*H04Q 7/20* (2006.01)
(52) U.S. Cl. ...................................... 370/252; 370/468
(58) Field of Classification Search .................. 370/252, 370/468
See application file for complete search history.

(56) References Cited

U.S. PATENT DOCUMENTS

| | | |
|---|---|---|
| 5,297,144 A | 3/1994 | Gilbert et al. |
| 5,404,374 A | 4/1995 | Mullins et al. |
| 5,444,698 A | 8/1995 | Kito |
| 5,596,577 A | 1/1997 | Perrault et al. |
| 5,615,212 A | 3/1997 | Ruszczyk et al. |
| 5,638,374 A | 6/1997 | Heath |

(Continued)

FOREIGN PATENT DOCUMENTS

EP         0 6 229 24         4/1994

(Continued)

OTHER PUBLICATIONS

U.S. Appl. No. 09/316,518, filed May 1999, Stanwood, et al.

(Continued)

*Primary Examiner*—Melvin Marcelo
(74) *Attorney, Agent, or Firm*—Procopio, Cory, Hargreaves & Savitch LLP

(57) ABSTRACT

A method and apparatus for allocating bandwidth in a broadband wireless communication system is disclosed. One embodiment uses a self-correcting bandwidth request/grant protocol. The self-correcting bandwidth request/grant protocol utilizes a combination of incremental and aggregate bandwidth requests. CPEs primarily transmit incremental bandwidth requests to their associated base stations, followed by periodic transmissions of aggregate bandwidth requests. The use of periodic aggregate bandwidth requests (that express the current state of their respective connection queues) allows the bandwidth allocation method and apparatus to be "self-correcting". Another embodiment utilizes an abridged bandwidth request/grant protocol to allocate bandwidth. The abridged bandwidth request/grant protocol system utilizes padding packets to request a reduction in bandwidth allocation to a CPE. A base station modem alerts a base station CPU when the BS modem receives a padding packet from a CPE. After alerting the BS CPU the method can reduce the associated CPE's bandwidth allocation.

33 Claims, 17 Drawing Sheets

U.S. PATENT DOCUMENTS

| | | |
|---|---|---|
| 5,675,573 A | 10/1997 | Karol et al. |
| 5,638,371 A | 5/1998 | Eng et al. |
| 6,016,311 A | 1/2000 | Gilbert et al. |
| 6,094,421 A | 7/2000 | Scott |
| 6,151,312 A | 11/2000 | Evans et al. |
| 6,222,832 B1 | 4/2001 | Proctor |
| 6,314,110 B1 | 11/2001 | Chin et al. |
| 6,337,849 B1 | 1/2002 | Smith et al. |
| 6,359,863 B1 | 3/2002 | Varma et al. |
| 6,388,999 B1 | 5/2002 | Gorsuch et al. |
| 6,438,141 B1 | 8/2002 | Hanko et al. |
| 6,470,016 B1 | 10/2002 | Kalkunte et al. |
| 6,785,252 B1 * | 8/2004 | Zimmerman et al. ........ 370/337 |

FOREIGN PATENT DOCUMENTS

| | | |
|---|---|---|
| GB | 2 320 162 | 12/1996 |
| WO | WO 98/10568 | 3/1998 |

OTHER PUBLICATIONS

Ulm et al., Data-Over-Cable Interface Specification, Radio Frequency Interface Specification, Hewlett Packard Interim Specification, Doc. Control No. SP-RFII01-970321, Published Mar. 21, 1997 by MCNS Holdings, L.P., Section 6 (Media Access Control Specification), pp. 43-85.

Qiu et al., Dynamic Reservation Multiple Access (DRMA): A New Multiple Access Scheme for Personal Communication System (PCS), Wireless Networks 2 (1996), pp. 117-128, J.C. Baltzer AG, Science Publishers.

Kim, et al. PRMA/DA: A New Media Access Control Protocol for Wireless ATM, IEEE, Jun. 23, 1996, pp. 240-244.

U.S. District Court, Northern District of California, "Amended Complaint for Declaratory Judgment Demand for Jury Trial" filed Sep. 30, 2008 in Case No. 5:08-cv-4555.

* cited by examiner

METHOD AND APPARATUS FOR BANDWIDTH REQUEST/GRANT PROTOCOLS IN A WIRELESS COMMUNICATION SYSTEM

RELATED APPLICATIONS

This application claims priority to and is a continuation of U. S. application Ser. No. 09/783,671 filed Feb. 14, 2001 now abandoned titled "Method and Apparatus for Abridged Bandwidth Request/Grant Protocol in a Wireless Communication System" which is a continuation-in-part of U.S. application Ser. No. 09/316,518, filed May 21, 1999 now U.S. Pat. No. 6,925,068 titled "Method and Apparatus for Allocating Bandwidth in a Wireless Communication System" both of which are hereby incorporated by reference. This Application is also related to and hereby incorporates by reference U.S. Pat. No. 6,016,311 issued Jan. 18, 2000 and U.S. application Ser. No. 09/613,434, filed Jul. 11, 2000.

BACKGROUND OF THE INVENTION

1. Field of the Invention

This invention relates to wireless communication systems, and to a method and apparatus of bandwidth request/grant protocols in a broadband wireless communication system.

2. Description of Related Art

As described in the commonly assigned U.S. Pat. No. 6,016,311, issued Jan. 18, 2000, titled "An Adaptive Time Division Duplexing Method and Apparatus for Dynamic Bandwidth Allocation within a Wireless Communication System," which is hereby incorporated by reference, a wireless communication system facilitates two-way communication between a plurality of subscriber radio stations or subscriber units (fixed and portable) and a fixed network infrastructure. Exemplary communication systems include mobile cellular telephone systems, personal communication systems (PCS), and cordless telephones. The key objective of these wireless communication systems is to provide communication channels on demand between the plurality of subscriber units and their respective base stations in order to connect a subscriber unit user with the fixed network infrastructure (usually a wire-line system). In the wireless systems having multiple access schemes a time "frame" is used as the basic information transmission unit. Each frame is sub-divided into a plurality of time slots. Some time slots are used for control purposes and some for information transfer. Subscriber units typically communicate with the base station using a "duplexing" scheme thus allowing the exchange of information in both directions of connection.

Transmissions from the base station to the subscriber unit are commonly referred to as "downlink" transmissions. Transmissions from the subscriber unit to the base station are commonly referred to as "uplink" transmissions. Depending upon the design criteria of a given system, the prior art wireless communication systems have typically used either time division duplexing (TDD) or frequency division duplexing (FDD) methods to facilitate the exchange of information between the base station and the subscriber units. Both the TDD and FDD duplexing schemes are well known in the art.

Recently, wideband or "broadband" wireless communications networks have been proposed for providing delivery of enhanced broadband services such as voice, data and video services. The broadband wireless communication system facilitates two-way communication between a plurality of base stations and a plurality of fixed subscriber stations or Customer Premises Equipment (CPE). One exemplary broadband wireless communication system is described in the incorporated patent, U.S. Pat. No. 6,016,311, and is shown in the block diagram of FIG. 1. As shown in FIG. 1, the exemplary broadband wireless communication system 100 includes a plurality of cells 102. Each cell 102 contains an associated cell site 104 that primarily includes a base station 106 and an active antenna array 108. Each cell 102 provides wireless connectivity between the cell's base station 106 and a plurality of customer premises equipment (CPE) 110 positioned at fixed customer sites 112 throughout the coverage area of the cell 102. The users of the system 100 may include both residential and business customers. Consequently, the users of the system have different and varying usage and bandwidth requirement needs. Each cell may service several hundred or more residential and business CPEs.

The broadband wireless communication system 100 of FIG. 1 provides true "bandwidth-on-demand" to the plurality of CPEs 110. CPEs 110 request bandwidth allocations from their respective base stations 106 based upon the type and quality of services requested by the customers served by the CPEs. Different broadband services have different bandwidth and latency requirements. The type and quality of services available to the customers are variable and selectable. The amount of bandwidth dedicated to a given service is determined by the information rate and the quality of service required by that service (and also taking into account bandwidth availability and other system parameters). For example, T1-type continuous data services typically require a great deal of bandwidth having well-controlled delivery latency. Until terminated, these services require constant bandwidth allocation on each frame. In contrast, certain types of data services such as Internet protocol data services (TCP/IP) are bursty, often idle (which at any one instant requires zero bandwidth), and are relatively insensitive to delay variations when active.

Due to the wide variety of CPE service requirements, and due to the large number of CPEs serviced by any one base station, the bandwidth allocation process in a broadband wireless communication system such as that shown in FIG. 1 can become burdensome and complex. This is especially true with regard to the allocation of uplink bandwidth. Base stations do not have a priori information regarding the bandwidth or quality of services that a selected CPE will require at any given time. Consequently, requests for changes to the uplink bandwidth allocation are necessarily frequent and varying. Due to this volatility in the uplink bandwidth requirements, the many CPEs serviced by a selected base station will need to frequently initiate bandwidth allocation requests. If uncontrolled, the bandwidth allocation requests will detrimentally affect system performance. If left unchecked, the bandwidth required to accommodate CPE bandwidth allocation requests will become disproportionately high in comparison with the bandwidth allocated for the transmission of substantive traffic data. Thus, the communication system bandwidth available to provide broadband services will be disadvantageously reduced.

Some prior art systems have attempted to solve bandwidth allocation requirements in a system having a shared system resource by maintaining logical queues associated with the various data sources requiring access to the shared system resource. Such a prior art system is taught by Karol et al., in U.S. Pat. No. 5,675,573, that issued on Oct. 7, 1997. More specifically, Karol et al. teach a bandwidth allocation system that allows packets or cells within traffic flows from different sources that are contending for access to a shared processing fabric to get access to that fabric in an order that is determined primarily on individual guaranteed bandwidth requirements associated with each traffic flow. In addition, the system taught by Karol et al. allow the different sources to gain access to the shared processing fabric in an order determined secondarily on overall system criteria, such as a time of arrival, or due date of packets or cells within the traffic flows. Packets or cells of data from each data source (such as a bandwidth requesting device) are queued in separate logical buffers while they await access to the processing fabric.

The bandwidth allocation techniques described in the commonly assigned and incorporated U.S. patent application Ser. No.: 09/316,518, filed May 21, 2000, utilizes mechanisms referred to as "bandwidth request/grant protocols" to provide on-demand bandwidth needs of individual CPE connections. Typically, bandwidth request/grant protocols operate in accordance with the following description. A CPE typically transmits a bandwidth request to an associated base station. The request identifies the aggregate (i.e., the total) bandwidth needs of the connection. The base station receives the bandwidth request and determines whether sufficient bandwidth is available to grant the bandwidth request. If sufficient bandwidth is available, the requested bandwidth is granted to the connection, else the base station waits for sufficient bandwidth to become available before granting the requested bandwidth. As described in the parent patent application, bandwidth request/grant protocols improve bandwidth allocation efficiencies in wireless communication systems under ideal conditions.

However, as is well known, bandwidth requests (and associated grants) can be lost (i.e., never received by the associated base station) or delayed due to noise and interference effects inherent to all wireless communication systems. When bandwidth requests are lost or delayed during transmission between a CPE and a base station, bandwidth allocation efficiencies can be adversely affected. Lost or delayed bandwidth requests contribute to the reduction of bandwidth allocation efficiency in wireless communication systems by causing the base stations to inaccurately allocate bandwidth to their associated and respective CPEs.

For example, consider the situation where a selected CPE transmits a bandwidth request to its associated base station wherein the request identifies the aggregate bandwidth requirements of the selected CPE. Assume that the bandwidth request is lost in transmission due to interference on the air link between the base station and the selected CPE. In this example, the associated base station never receives the aggregate bandwidth requirements of the selected CPE, and the base station therefore never grants the CPE's bandwidth request. After waiting a suitable period of time, the CPE will determine that is has not received a bandwidth grant from the base station. Disadvantageously, the CPE will be unable to determine if the bandwidth request was lost during transmission or if the base station simply did not have sufficient bandwidth to grant the request (given the quality of service ("QoS") of the associated connection).

The CPE may then transmit a second bandwidth request for the same connection. Under certain conditions, a "race condition" may occur that could cause the bandwidth allocation technique to waste the allocation of bandwidth. If the timing of the bandwidth requests (and subsequent grants) is such that the selected CPE issues the second bandwidth request for the same connection concurrently with the base station's grant of the first request, the second request and the grant to the first request may be concurrently transmitted over the link. That is, if the base station transmits a grant to the first request before receiving the second request from the CPE, the base station may respond to the second request and consequently grant a duplicate bandwidth request for the same connection. This disadvantageously results in an efficient allocation of bandwidth.

One alternative bandwidth request/grant protocol that prevents the occurrence of the above-described "race condition" is the so-called "guaranteed delivery protocol." As is well known, guaranteed delivery protocols make use of acknowledgment messages that are transmitted in response to bandwidth requests. In accordance with the guaranteed delivery protocol approach, a CPE transmits to its associated base station a bandwidth request that identifies the aggregate bandwidth needs of a selected connection. The base station receives the bandwidth request and transmits an acknowledgment to the CPE thereby communicating receipt of the bandwidth request. If an acknowledgment is not received by the CPE, the CPE retransmits the bandwidth request. Advantageously, guaranteed delivery protocols vastly reduce the possibility of the base station erroneously allocating duplicate bandwidth to the CPE (as described above), and thus, improves bandwidth allocation efficiencies. However, guaranteed delivery protocols disadvantageously require additional bandwidth necessary for transmitting acknowledgement messages between the base stations and the CPEs. Furthermore, response time associated with the allocation of bandwidth is reduced because the CPEs must wait to receive acknowledgements from their associated base stations.

Some bandwidth request/grant protocols known as "incremental bandwidth request/grant protocols" attempt to solve the above-described problems relating to data transmission efficiency by utilizing incremental bandwidth requests instead of aggregate bandwidth requests. Incremental bandwidth requests identify the additional bandwidth needs of a CPE connection. For example, in accordance with incremental bandwidth request methods, a base station may allocate 1000 units of bandwidth to an associated CPE connection. At a later time, the CPE connection may require 1,500 units of aggregate bandwidth (i.e., it may require an additional 500 units of bandwidth). In accordance with the incremental bandwidth request/grant protocol, the CPE will transmit an incremental bandwidth request to its associated base station indicating that it requires an additional 500 units of bandwidth. Upon receiving the incremental bandwidth request, the base station calculates the CPE connection's current aggregate bandwidth needs as 1500 units (1000 previously granted units+500 requested units).

Advantageously, systems using the incremental bandwidth request/grant protocols respond faster and require less bandwidth than do those using the guaranteed delivery protocols because acknowledgment messages are not required by the incremental bandwidth request/grant protocols. Disadvantageously, when an incremental bandwidth request is lost, the base station loses synchronization with the CPE connection, and thereby loses track of the aggregate bandwidth needs of the CPE. Synchronization is lost because the base stations typically calculate aggregate bandwidth needs by adding each incremental bandwidth request to the previous aggregate bandwidth needs estimate. Thus, the base station and the CPE connection will remain out of synchronization until the CPE connection is reset.

Some bandwidth request/grant protocol systems have attempted to solve bandwidth allocation requirements in a system having a shared system resource by utilizing "zero bandwidth request" (ZBR) messages. One such exemplary bandwidth allocation system is known as a zero bandwidth request message protocol system and is now described. ZBR message protocol systems utilize "padding packets" and the well-known TDMA multiplexing scheme. In the well-known TDMA multiplexing scheme, a BS designates a portion of its uplink sub-frame (i.e., bandwidth) to an associated CPE. The associated CPE transmits data to the BS on the uplink. When a CPE does not have enough uplink data to utilize its entire portion of bandwidth (i.e., it has too much bandwidth allocation), it transmits padding packets to "pad" or fill its unused portion of bandwidth. The CPE then transmits a ZBR message to its associated base station (BS) to request a reduction in the CPE's bandwidth allocation. The CPE's associated BS then reduces the CPE's bandwidth allocation accordingly.

Disadvantageously in ZBR message protocol systems, utilization of ZBR messages decreases a communication systems overall speed. Base stations and CPEs require increased processing time to process and transmit ZBR messages, respectively. A BS requires increased processing time to process ZBR messages. This disadvantage is magnified in typical communication systems because a BS typically receives ZBR messages from hundreds of associated CPEs. Thus, each BS in the communication system requires relatively large amounts of time to process these ZBR messages.

Another disadvantage of zero bandwidth request message protocol systems is that CPEs can become "confused" when deciding whether to transmit zero bandwidth requests to their associated base stations. For example, a CPE has the following status: a CG connection rate of one cell per second and a DAMA connection with no data available. When the CPE's associated BS allocates one cell within a one-second time interval the cell may not yet be available within the CPE's ATM controller queues. In accordance with the ZBR protocol system, the CPE should transmit a ZBR message because of the "no data available" status of the DAMA connection. However, the CPE does not know whether or not a CG cell is going to be sent and thus it does not know whether or not to transmit a ZBR message to its associated BS. Thus, the CPE becomes confused and can erroneously transmit or refrain from transmitting a ZBR message.

A need exists for a bandwidth request/grant protocol method and apparatus that efficiently processes and responds to bandwidth allocation requests. The bandwidth allocation method and apparatus should accommodate an arbitrarily large number of CPEs generating frequent and varying bandwidth allocation requests on the uplink of a wireless communication system. For example, in the system shown in FIG. 1, as many as one hundred CPEs may be allowed to be simultaneously active, coordinating their transmissions on the uplink. Furthermore, the system can accommodate approximately one thousand CPEs on the physical channel. Such a bandwidth allocation method and apparatus should be efficient in terms of the amount of bandwidth consumed by the bandwidth request and grant messages that are exchanged between the plurality of base stations and the plurality of CPEs. That is, the plurality of bandwidth requests generated by the CPE should consume a minimum percentage of available uplink bandwidth. In addition, the bandwidth allocation method and apparatus should respond to the bandwidth allocation requests in a timely and accurate manner. The method and apparatus should be responsive to the needs of a particular communication link. The bandwidth needs may vary due to several factors, including the type of service provided over the link and the user type. Bandwidth should be allocated to high priority services in a sufficiently short time frame to maintain the quality of service specified by the CPE. The bandwidth request/grant protocol method and apparatus should correct itself when a bandwidth request is lost due to the noise or interference effects present on an air link.

SUMMARY OF THE INVENTION

The present invention is a method and apparatus for requesting and allocating bandwidth in a broadband wireless communication system. In one embodiment, the method and apparatus is a self-correcting bandwidth request/grant protocol that efficiently allocates bandwidth in the wireless communication system. The self-correcting bandwidth request/grant protocol utilizes a combination of incremental and aggregate bandwidth requests. CPEs primarily transmit incremental bandwidth requests to associated and respective base stations. The CPEs also periodically transmit aggregate bandwidth requests to their associated base stations. By primarily requiring incremental bandwidth requests, the possibility that a base station will erroneously issue duplicate bandwidth allocations to the same CPE for the same connection is vastly reduced. Race conditions that may have occurred when only aggregate bandwidth requests are transmitted are eliminated by requiring the CPEs to request bandwidth in an incremental manner.

In addition, by requiring the CPEs to periodically transmit aggregate bandwidth requests (that express the current state of their respective connection queues), the bandwidth allocation method and apparatus is "self-correcting". The bandwidth allocation method and apparatus is self-correcting because any lost incremental bandwidth requests are detected by the base stations when the aggregate bandwidth requests are received from their respective CPEs. Upon receipt and processing of the aggregate bandwidth requests, the base stations reset their records to correctly reflect the current bandwidth requirements of their associated CPEs. Periodic use of aggregate bandwidth requests provides a self-correcting bandwidth allocation protocol yet without the bandwidth overhead (e.g., bandwidth required to transmit acknowledgements) typically associated with the prior art self-correcting protocols (such as the guaranteed delivery protocols).

In wireless communication systems, DAMA services are allocated bandwidth on a demand-assignment basis. When a CPE requires additional bandwidth on a DAMA connection, it transmits a bandwidth request message to an associated base station. The CPE transmits an incremental bandwidth request to its associated base station. Periodically (e.g., every fifth bandwidth request), the CPE transmits an aggregate bandwidth request to its associated base station. The aggregate bandwidth request is used by the base station to "reset" (or update) its records to reflect the CPE's current bandwidth requirements. In this manner, the present bandwidth allocation protocol is said to be "self-correcting." In additional embodiments, four consecutive incremental bandwidth requests are transmitted, followed by one aggregate bandwidth request transmission. In alternative embodiments, alternative patterns of consecutive incremental and aggregate bandwidth requests can be used.

In one embodiment, the method and apparatus utilizes an abridged bandwidth request/grant protocol to allocate bandwidth. This embodiment utilizes padding packets to request a reduction in bandwidth allocation to a CPE. In one embodiment, a base station modem alerts a base station CPU when the BS modem receives padding packets from a CPE. After alerting the BS CPU the present inventive method can reduce the associated CPE's bandwidth allocation.

The embodiments herein disclosed reduce the amount of bandwidth that must be allocated for bandwidth request and bandwidth allocation purposes. The opportunities for allowing a CPE to request bandwidth are very tightly controlled and utilize a combination of a number of bandwidth request and allocation techniques to control the bandwidth request process. There are a number of means by which a CPE can transmit a bandwidth request message to an associated base station.

One such means uses a "polling" technique whereby a base station polls one or more CPEs and allocates bandwidth specifically for the purpose of allowing the CPEs to respond with a bandwidth request. The polling of the CPEs by the base station may be in response to a CPE setting a "poll-me bit" or, alternatively, it may be periodic. In accordance with the present invention, periodic polls may be made to individual CPEs, to groups of CPEs, or to every CPE on a physical channel. When individually polling a CPE, the base station polls an individual CPE by allocating uplink bandwidth in an uplink sub-frame map to allow the CPE to respond with a bandwidth request. Similarly, in group polling, the base station polls several CPEs by allocating uplink bandwidth in the uplink sub-frame map to allow the CPEs to respond with a bandwidth request. The CPEs must contend for the allocated bandwidth if collisions occur. Bandwidth allocations are not in the form of an explicit message that is communicated by the base station to the CPEs, but rather the bandwidth allocations are transmitted implicitly by allocating bandwidth in the uplink sub-frame map.

Another means used in reducing bandwidth consumed by the bandwidth request messages is the technique of "piggybacking" bandwidth requests on bandwidth already allocated to a CPE. In accordance with this technique, currently active CPEs request bandwidth using previously unused portions of uplink bandwidth that is already allocated to the CPE. Alternatively, the bandwidth requests can be piggybacked on uplink bandwidth already allocated and currently being used by a data service. In accordance with this alternative, the CPE "steals" bandwidth already allocated for a data connection by inserting bandwidth requests in time slots previously used for data.

The CPE is responsible for distributing the allocated uplink bandwidth in a manner that accommodates the services provided by the CPE. The CPE is free to use the uplink bandwidth that was allocated to it in a manner that is different than that originally requested or granted by the base station. The CPE advantageously determines which services to give bandwidth to and which services must wait for subsequent bandwidth requests. One advantage of having the CPE determine how to distribute its allocated bandwidth is that it relieves the base station from performing this task. In addition, the communication overhead that is required by having the base station instruct the CPE how to distribute its allocated bandwidth is eliminated. By using a combination of bandwidth allocation techniques, the system advantageously makes use of the efficiency benefits associated with each technique.

The base station media access control ("MAC") allocates available bandwidth on a physical channel on the uplink and the downlink. Within the uplink and downlink sub-frames, the base station MAC allocates the available bandwidth between the various services depending upon the priorities and rules imposed by their quality of service ("QoS"). The base station MAC maintains a set of queues for each physical channel that it serves. Within each physical channel queue set, the base station maintains a queue for each QoS. The queues hold data that is ready to be transmitted to the CPEs present on the physical channel. The base station higher MAC control layers are free to implement any convenient fairness or traffic shaping algorithms regarding the sharing of access between connections at the same QoS, without impacting the base station lower MAC control layers. In determining the amount of bandwidth to allocate at a particular QoS for a particular CPE, the base station takes into account the QoS, modulation, and the fairness criteria used to keep an individual CPE from using up all available bandwidth. In one embodiment, the base station attempts to balance the uplink/downlink bandwidth allocations using an adaptive time-division duplexing technique (ATDD).

The uplink bandwidth allocation method is very similar to the downlink bandwidth allocation except that, rather than being maintained by the base station, the data queues are distributed across and maintained by each individual CPE. Rather than check the queue status directly, the base station preferably receives requests for bandwidth from the CPEs using the techniques described above.

BRIEF DESCRIPTION OF THE DRAWINGS

Like reference numbers and designations in the various drawings indicate like elements.

DETAILED DESCRIPTION OF THE INVENTION

Throughout this description, the preferred embodiment and examples shown should be considered as exemplars, rather than as limitations on the present invention.

The embodiments of the present invention are methods and apparatuses for bandwidth request/grant protocols that allocate bandwidth in a broadband wireless communication system. One very important performance criterion of a broadband wireless communication system, and any communication system for that matter having a physical communication medium shared by a plurality of users, is how efficiently the system uses the physical medium. Because wireless communication systems are shared-medium communication networks, access and transmission by subscribers to the network must be controlled. In wireless communication systems a Media Access Control ("MAC") protocol typically controls user accesses to the physical medium. The MAC determines when subscribers are allowed to transmit on the physical medium. In addition, if contentions are permitted, the MAC controls the contention process and resolves any collisions that occur.

Figure 1:
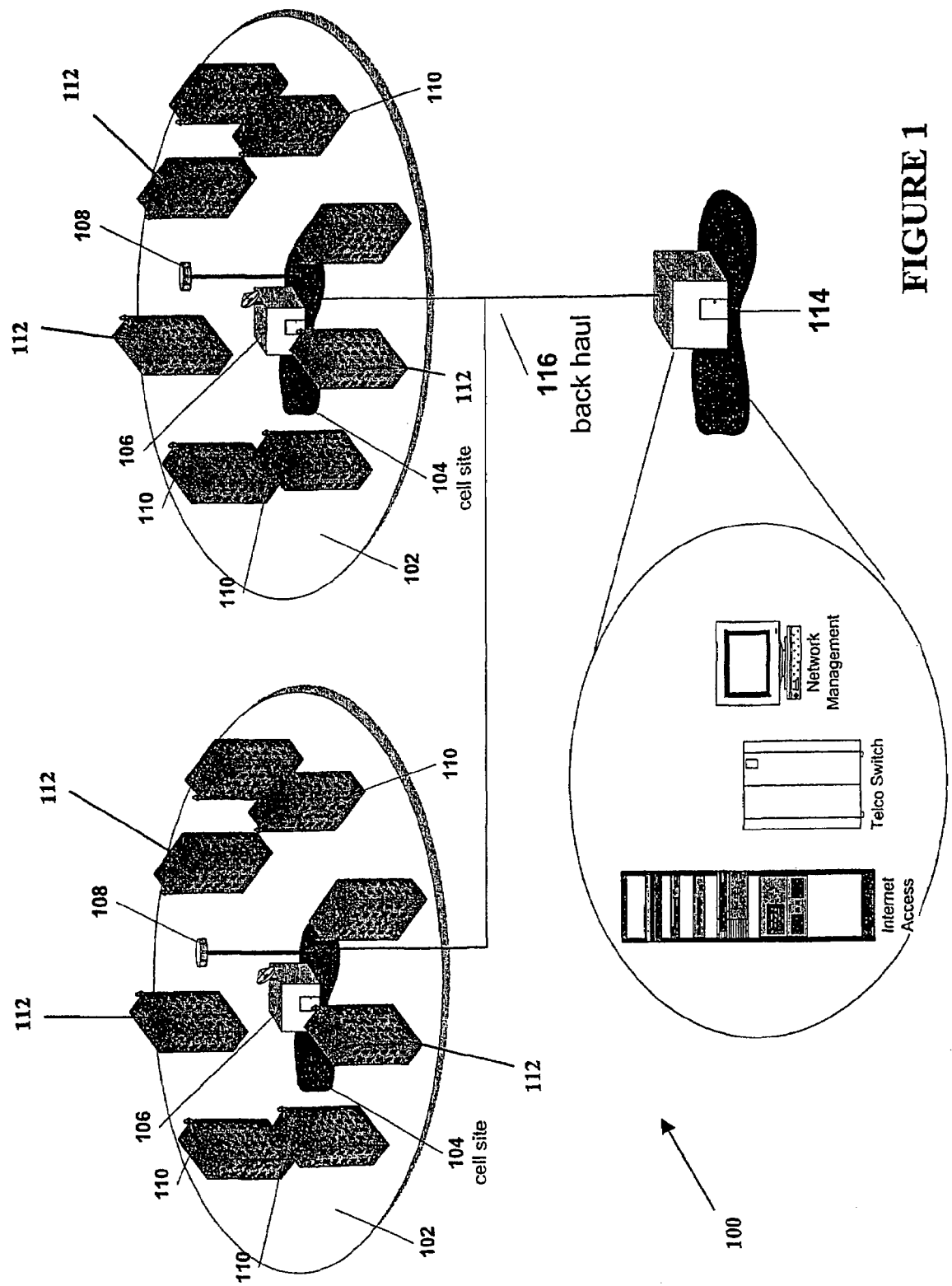
FIG. 1 shows a broadband wireless communication system adapted for use with the present invention.

In the system shown in FIG. 1, the MAC executed by software present in the base stations 106 (in some embodiments, the software may execute on processors both in the base stations and the CPE) control the transmission time for all of the CPEs 110. The base stations 106 receive requests for transmission rights and grant these requests within the time available taking into account the priorities, service types, quality of service and other factors associated with the CPEs 110. As described above in the background of the invention, the services provided by the CPEs 110 TDM information such as voice trunks from a PBX. At the other end of the service spectrum, the CPEs may uplink bursty yet delay-tolerant computer data for communication with the well-known World Wide Web or Internet.

The base station MAC maps and allocates bandwidth for both the uplink and downlink communication links. These maps are developed and maintained by the base station and are referred to as the Uplink Sub-frame Maps and Downlink Sub-frame Maps. The MAC must allocate sufficient bandwidth to accommodate the bandwidth requirements imposed by high priority constant bit rate (CBR) services such as T1, E1 and similar constant bit rate services. In addition, the MAC must allocate the remaining system bandwidth across the lower priority services such as Internet Protocol (IP) data services. The MAC distributes bandwidth among these lower priority services using various QoS dependent techniques such as fair-weighted queuing and round-robin queuing.

The downlink of the communication system shown in FIG. 1 operates on a point-to-multi-point basis (i.e., from the base station 106 to the plurality of CPEs 110). As described in U.S. Pat. No. 6,016,311, the central base station 106 includes a sectored active antenna array 108 which is capable of simultaneously transmitting to several sectors. In one embodiment of the system 100, the active antenna array 108 transmits to six independent sectors simultaneously. Within a given frequency channel and antenna sector, all stations receive the same transmission. The base station is the only transmitter operating in the downlink direction, hence it transmits without having to coordinate with other base stations, except for the overall time-division duplexing that divides time into upstream (uplink) and downstream (downlink) transmission periods. The base station broadcasts to all of the CPEs in a sector (and frequency). The CPEs monitor the addresses in the received messages and retain only those addressed to them.

The CPEs 110 share the uplink on a demand basis that is controlled by the base station MAC. Depending upon the class of service utilized by a CPE, the base station may issue a selected CPE continuing rights to transmit on the uplink, or the right to transmit may be granted by a base station after receipt of a request from the CPE. In addition to individually addressed messages, messages may also be sent by the base station to multicast groups (control messages and video distribution are examples of multicast applications) as well as broadcast to all CPEs.

Within each sector, in accordance with the present invention, CPEs must adhere to a transmission protocol that minimizes contention between CPEs and enables the service to be tailored to the delay and bandwidth requirements of each user application. As described below in more detail, this transmission protocol is accomplished through the use of a polling mechanism, with contention procedures used as a backup mechanism should unusual conditions render the polling of all CPEs unfeasible in light of given delay and response-time constraints. Contention mechanisms can also be used to avoid individually polling CPEs that are inactive for long time periods. The polling techniques provided by the present inventive method and apparatus simplifies the access process and guarantees that service applications receive bandwidth allocation on a deterministic basis if required. In general, data service applications are relatively delay-tolerant. In contrast, real-time service applications such as voice and video services require that bandwidth allocations be made in a timely manner and in adherence to very tightly-controlled schedules.

Frame Maps—Uplink and Downlink Sub-Frame Mappings

In one embodiment, the base stations 106 maintain sub-frame maps of the bandwidth allocated to the uplink and downlink communication links. As described in the related and incorporated U.S. Pat. No. 6,016,311, the uplink and downlink are multiplexed in a time-division duplex (or "TDD") manner. In one embodiment, a frame is defined as comprising N consecutive time periods or time slots (where N remains constant). In accordance with this "frame-based" approach, the communication system dynamically configures the first $N_1$ time slots (where N is greater than or equal to $N_1$) for downlink transmissions only. The remaining $N_2$ time slots are dynamically configured for uplink transmissions only (where $N_2$ equals $N-N_1$). Under this TDD frame-based scheme, the downlink sub-frame is preferably transmitted first and is prefixed with information that is necessary for frame synchronization.

As is well known in the communications art, in another communication system, the uplink and downlink can be multiplexed using the well known frequency-division duplex (or "FDD") approach. FDD techniques are well known in the communication arts and thus are not described in more detail herein. However, one exemplary TDD system is described in detail herein. The invention present invention can be used in both the described TDD communication system, or in an FDD communication system.

Figure 2:
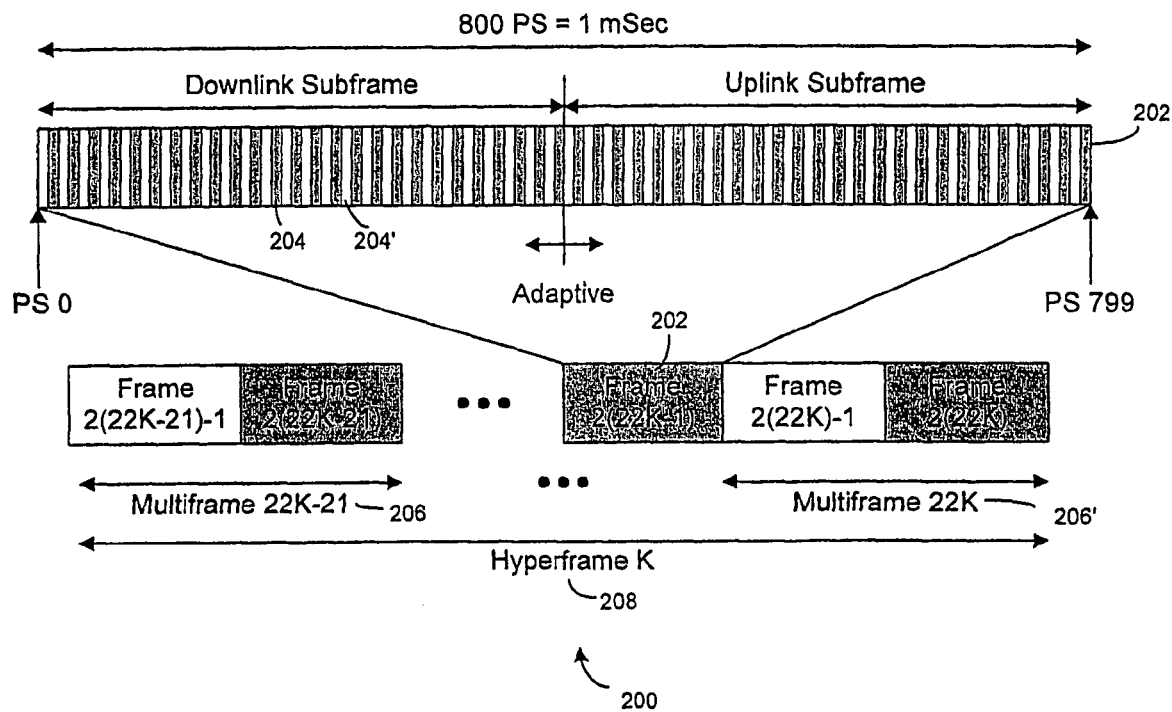
FIG. 2 shows a TDD frame and multi-frame structure that can be used by the communication system of FIG. 1 in practicing the present invention.

FIG. 2 shows a TDD frame and multi-frame structure 200 that can be used by a communication system (such as that shown in FIG. 1) in practicing the embodiments. As shown in FIG. 2, the TDD frame is subdivided into a plurality of physical slots (PS) 204. In the embodiment shown in FIG. 2, the frame is one millisecond in duration and includes 800 physical slots. Alternatively, the present invention can be used with frames having longer or shorter duration and with more or fewer PSs. The available bandwidth is allocated by a base station in units of a certain pre-defined number of PSs. Some form of digital encoding, such as the well-known Reed-Solomon encoding method, is performed on the digital information over a pre-defined number of bit units referred to as information elements (PI). The modulation may vary within the frame and determines the number of PS (and therefore the amount of time) required to transmit a selected PI.

As described in the incorporated U.S. Pat. No. 6,016,311, in one embodiment of the broadband wireless communication system shown in FIG. 1, the TDD framing is adaptive. That is, the number of PSs allocated to the downlink versus the uplink varies over time. The present bandwidth allocation method and apparatus can be used in both adaptive and fixed TDD systems using a frame and multi-frame structure similar to that shown in FIG. 2. As described above, the embodiments disclosed herein can also be used in FDD communication systems. As shown in FIG. 2, to aid periodic functions, multiple frames 202 are grouped into multi-frames 206, and multiple multi-frames 206 are grouped into hyper-frames 208. In one embodiment, each multi-frame 206 comprises two frames 202, and each hyper-frame comprises twenty-two multi-frames 206. Other frame, multi-frame and hyper-frame structures can be used with the present invention. For example, in another embodiment of the present invention, each multi-frame 206 comprises sixteen frames 202, and each hyper-frame comprises thirty-two multi-frames 206. Exemplary downlink and uplink sub-frames are shown respectively in FIGS. 3 and 4.

Downlink Sub-Frame Map

Figure 3:
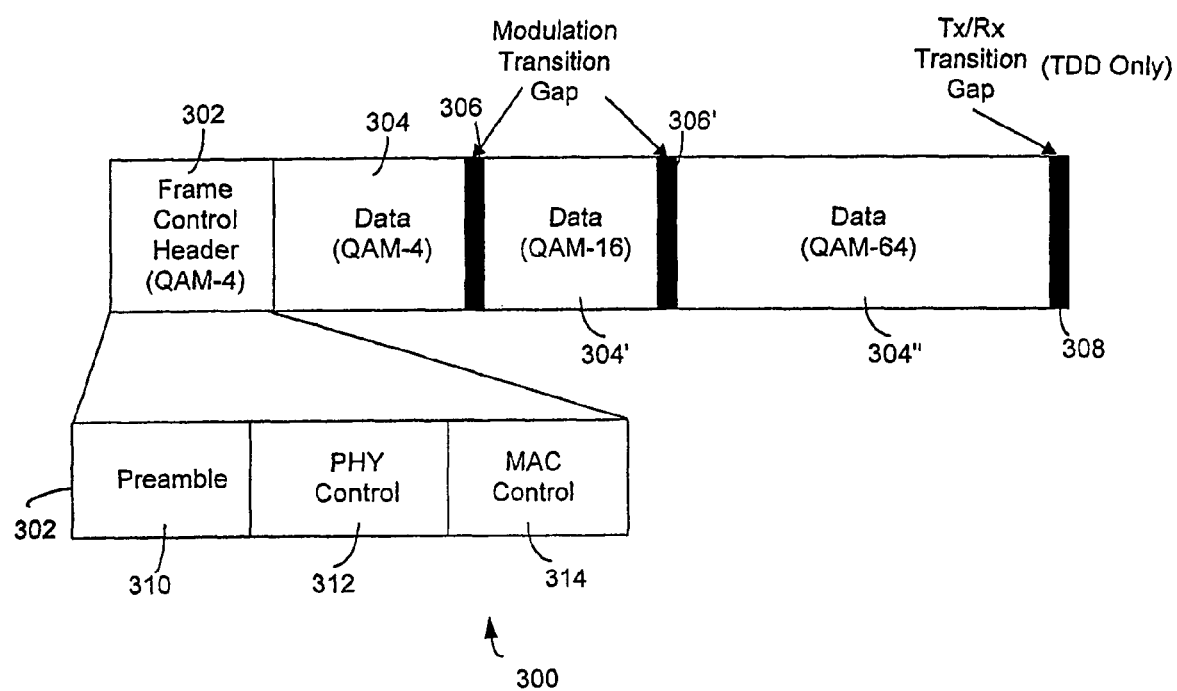
FIG. 3 shows an example of a downlink sub-frame that can be used by the base stations to transmit information to the plurality of CPEs in the wireless communication of FIG. 1.

FIG. 3 shows one example of a downlink sub-frame 300 that can be used by the base stations 106 to transmit information to the plurality of CPEs 110. The base station preferably maintains a downlink sub-frame map that reflects the downlink bandwidth allocation. The downlink sub-frame 300 preferably comprises a frame control header 302, a plurality of downlink data PSs 304 grouped by modulation type (e.g., PS 304 data modulated using a QAM-4 modulation scheme, PS 304' data modulated using QAM-16, etc.) and possibly separated by associated modulation transition gaps (MTGs) 306 used to separate differently modulated data, and a transmit/receive transition gap 308. In any selected downlink sub-frame any one or more of the differently modulated data blocks may be absent. In one embodiment, modulation transition gaps (MTGs) 306 are 0 PS in duration. As shown in FIG. 3, the frame control header 302 contains a preamble 310 used by the physical protocol layer (or PHY) for synchronization and equalization purposes. The frame control header 302 also includes control sections for both the PHY (312) and the MAC (314).

The downlink data PSs are used for transmitting data and control messages to the CPEs 110. This data is preferably encoded (using a Reed-Solomon encoding scheme for example) and transmitted at the current operating modulation used by the selected CPE. Data is preferably transmitted in a pre-defined modulation sequence: such as QAM-4, followed by QAM-16, followed by QAM-64. The modulation transition gaps 306 contain preambles and are used to separate the modulations. The PHY Control portion 312 of the frame control header 302 preferably contains a broadcast message indicating the identity of the PS 304 at which the modulation scheme changes. Finally, as shown in FIG. 3, the Tx/Rx transition gap 308 separates the downlink sub-frame from the uplink sub-frame which is described in more detail below.

Uplink Sub-Frame Map

Figure 4:
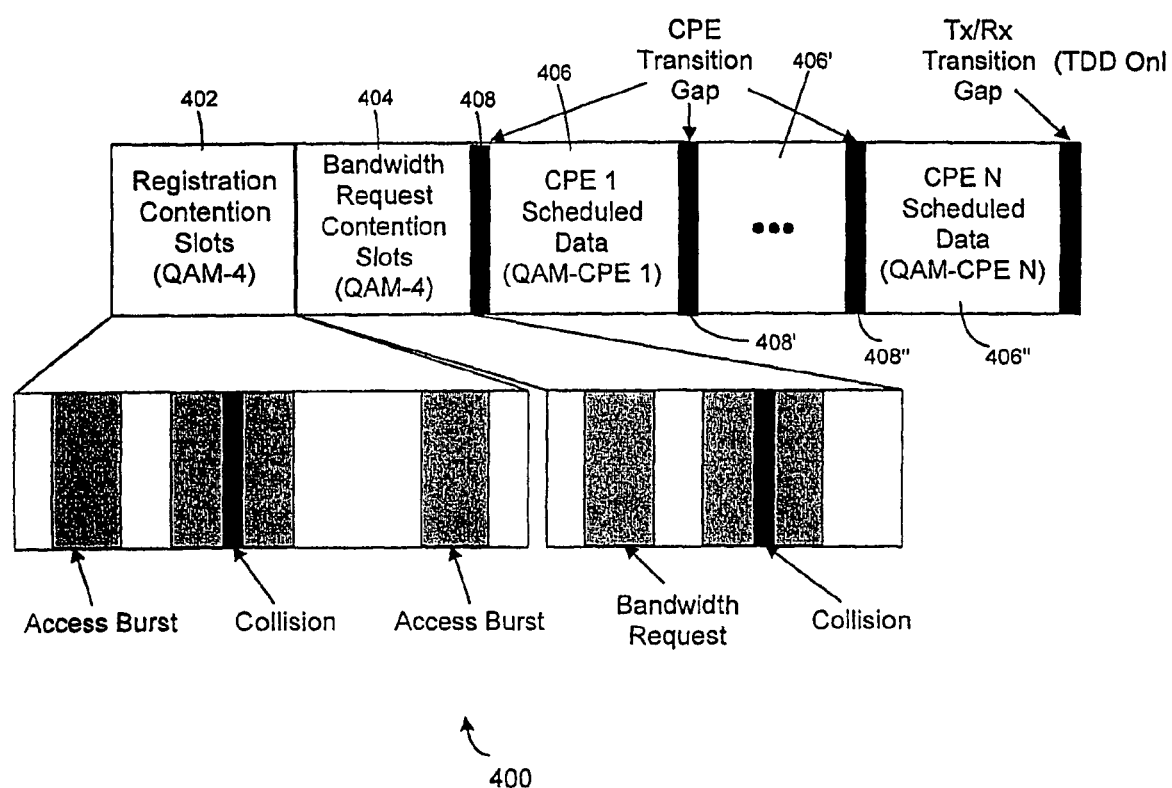
FIG. 4 shows an exemplary uplink sub-frame that is adapted for use with the present bandwidth allocation invention.

FIG. 4 shows one example of an uplink sub-frame 400 that is adapted for use with the present bandwidth allocation invention. In accordance with the present bandwidth allocation method and apparatus, the CPEs 110 (FIG. 1) use the uplink sub-frame 400 to transmit information (including bandwidth requests) to their associated base stations 106. As shown in FIG. 4, there are three main classes of MAC control messages that are transmitted by the CPEs 110 during the uplink frame: (1) those that are transmitted in contention slots reserved for CPE registration (Registration Contention Slots 402); (2) those that are transmitted in contention slots reserved for responses to multicast and broadcast polls for bandwidth allocation (Bandwidth Request Contention Slots 404); and those that are transmitted in bandwidth specifically allocated to individual CPEs (CPE Scheduled Data Slots 406).

The bandwidth allocated for contention slots (i.e., the contention slots 402 and 404) is grouped together and is transmitted using a pre-determined modulation scheme. For example, in the embodiment shown in FIG. 4 the contention slots 402 and 404 are transmitted using a QAM-4 modulation. The remaining bandwidth is grouped by CPE. During its scheduled bandwidth, a CPE 110 transmits with a fixed modulation that is determined by the effects of environmental factors on transmission between that CPE 110 and its associated base station 106. The downlink sub-frame 400 includes a plurality of CPE transition gaps (CTGs) 408 that serve a similar function to the modulation transition gaps (MTGs) 306 described above with reference to FIG. 3. That is, the CTGs 408 separate the transmissions from the various CPEs 110 during the uplink sub-frame. In one embodiment, the CTGs 408 are 2 physical slots in duration. A transmitting CPE preferably transmits a 1 PS preamble during the second PS of the CTG 408 thereby allowing the base station to synchronize to the new CPE 110. Multiple CPEs 110 may transmit in the registration contention period simultaneously resulting in collisions. When a collision occurs the base station may not respond.

By using the bandwidth allocation method and apparatus disclosed herein, scheduled uplink traffic data is bandwidth allocated to specific CPEs 110 for the transmission of control messages and services data. The CPE scheduled data is ordered within the uplink sub-frame 400 based upon the modulation scheme used by the CPEs 110. In accordance with the present invention and in the manner described in detail below, bandwidth is requested by a CPE 110 and is subsequently granted by an associated base station 106. All of the bandwidth allocated to a selected CPE within a given TDD frame (or alternatively an adaptive TDD frame, as the case may be) is grouped into a contiguous CPE scheduled data block 406. The physical slots allocated for the CTGs 408 are included in the bandwidth allocation to a selected CPE 110 in the base station uplink sub-frame map.

In addition to the bandwidth that is allocated for the transmission of the various types of broadband services (i.e., the bandwidth allocated for the CPE scheduled data slots 406), and the bandwidth allocated for CPE registration contention slots, bandwidth must also be allocated by the base station MAC for control messages such as requests for additional bandwidth allocations. As described in more detail below, in accordance with the present invention, CPEs 110 request changes to their bandwidth allocations by making bandwidth requests of their associated base stations 106. The present inventive method and apparatus reduces the amount of bandwidth that must be set aside for these bandwidth allocation requests. In accordance with the present invention, the opportunities for requesting bandwidth are very tightly controlled. The present invention advantageously utilizes a combination of a number of techniques to tightly control the bandwidth request process. There are a number of means by which a CPE can transmit a bandwidth request message to its associated base station.

For example, one such means uses a "polling" technique whereby a base station polls one or more CPEs and allocates bandwidth specifically for the purpose of allowing the CPE(s) to transmit bandwidth requests. In accordance with this method, the polling of CPEs by the base station may be in response to a CPE setting a "poll-me bit" in an upstream direction or it may be periodic. In accordance with the present invention, periodic polls may be made to individual CPEs (referred to as "reservation-based" polling), to groups of CPEs ("multicast" polling), or to every CPE on a physical channel ("broadcast" polling). In reservation-based polling, the base station polls an individual CPE and then allocates uplink bandwidth to allow the CPE to respond with a bandwidth request. Similarly, in multicast and broadcast polling, the base station polls several CPEs and then allocates uplink bandwidth to allow the CPEs to respond with a bandwidth request. However, the CPEs must contend for the allocated bandwidth if collisions occur. Advantageously, neither the bandwidth polls nor the bandwidth allocations are in the form of explicit messages that are communicated by the base station to the CPEs. Rather, the bandwidth polls comprise unsolicited grants of bandwidth sufficient for transmitting bandwidth requests. Bandwidth allocations are implicit via bandwidth allocations occurring in the uplink sub-frame map. The polling techniques are described in more detail below with reference to FIGS. 4-10.

As shown in FIG. 4, a portion of the uplink bandwidth may periodically be allocated for these bandwidth allocation or CPE connection requests. The uplink sub-frame 400 includes a plurality of bandwidth request contention slots 404. A CPE 110 must first be registered and achieve uplink synchronization with a base station before it is allowed to request bandwidth allocation. Therefore there is no need to allow for transmit time uncertainties in the length of the bandwidth request contention period. Consequently the bandwidth request contention period may be as small as a single PI, which, in one embodiment, at QAM-4 requires 6 PS. As with the registration requests, if a collision occurs, the base station may not respond to the CPE. If, however, the base station successfully receives a bandwidth request message from a CPE, it responds by allocating the CPE additional scheduled data 406 bandwidth in the uplink sub-frame 400. The various polling techniques used by the present invention help to minimize the need to use the contention slots 404. These techniques are described in more detail below.

Another means used by the present invention in reducing the bandwidth consumed by the bandwidth request messages is the technique of "piggybacking" bandwidth requests on bandwidth already allocated to a CPE. In accordance with this technique, currently active CPEs request bandwidth using previously unused portions of uplink bandwidth that is already allocated to the CPE. The necessity of polling CPEs is thereby eliminated. In an alternative embodiment of the present invention, bandwidth requests are piggybacked on uplink bandwidth allocated and actively being used by a data service. In accordance with this alternative, the CPE "steals" bandwidth already allocated for a data connection by inserting bandwidth requests in time slots previously used for data. The details of these piggybacking techniques are described in more detail below with reference to FIG. 11.

Once a CPE is allocated bandwidth by the base station, the CPE, not the base station, is responsible for using the uplink bandwidth in a manner that can accommodate the services provided by the CPE. The CPE is free to use the uplink bandwidth that was allocated to it in a manner that is different than originally requested or granted by the base station. For example, the service requirements presented to a selected CPE can change after the selected CPE requests bandwidth from its associated base station. The CPE advantageously determines which services to give bandwidth to and which services must wait for subsequent bandwidth requests. To this end, the CPE maintains a priority list of services. Those services having higher priority (e.g., those services having high quality of service demands) will be allocated bandwidth before those services having lower priority (e.g., IP-type data services). If the CPE does not have sufficient bandwidth to meet its service requirements, the CPE will request additional bandwidth allocations by either setting its poll-me bit or by piggybacking a bandwidth allocation request.

One advantage of having the CPE determine how to distribute its allocated bandwidth is that it relieves the base station from performing this task. In addition, the communication overhead that is required by having the base station instruct the CPE how to distribute its allocated bandwidth is thereby eliminated, thus increasing usable system bandwidth. In addition, the CPE is in a much better position to respond to the varying uplink bandwidth allocation needs of high quality of service data services. Therefore, the CPE can better accommodate the needs of these types of service requirements than can the base station.

The various techniques used to enhance the efficiency of the bandwidth allocation request process are described in more detail below in the sub-sections that follow. Although these techniques are described in separate sub-sections, the present inventive method and apparatus advantageously uses all of the techniques in combination to reduce the bandwidth consumed by the bandwidth allocation requests.

Thus, the present invention advantageously makes use of the efficiency benefits associated with each bandwidth allocation technique. For example, although an individual polling technique is beneficial with regard to the ability to provide fast response times to bandwidth allocation requests, it is relatively inefficient with regard to the amount of bandwidth consumed by the bandwidth allocation process. In contrast, the group polling method is relatively efficient with regard to the bandwidth consumed by the bandwidth allocation process, but it is less efficient with regard to the ability to respond to bandwidth allocation requests. Use of a "poll-me" bit is relatively efficient when considered from both the bandwidth consumption and response time perspectives. In addition, the piggybacking technique further enhances bandwidth consumption efficiency by using previously unused portions of the bandwidth to send the bandwidth allocation requests. In contrast to the prior art approaches, the present invention advantageously uses all of these bandwidth allocation techniques in combination to maximize efficiency.

Polling

In one embodiment of the broadband wireless system 100 of FIG. 1 designed for use with the present invention, a CPE 110 is assigned a dedicated connection identifier (ID) when the CPE 110 first registers with the system 100. The ID is used when the base station 106 exchanges control messages with the plurality of CPEs 110. As described above, variations in bandwidth requirements (i.e., increases or decreases to bandwidth requirements) are necessary for all services transported by the system 100 with the exception of uncompressible constant bit rate, or continuous grant (CG) services. The bandwidth requirements of uncompressible CG services do not change between connection establishment and termination. The requirements of compressible CG services, such as channelized-T1 services, may increase or decrease depending on traffic.

In contrast, many of the data services facilitated by the system 100 of FIG. 1 are bursty and delay-tolerant. Because bandwidth is provided to these services on a demand assignment basis as needed these services are commonly referred to as Demand-Assigned Multiple Access or "DAMA" services.

When a CPE 110 needs to request bandwidth for a DAMA service it transmits a bandwidth request message to the base station 106. The bandwidth request messages communicate the immediate bandwidth requirements for the DAMA service. The bandwidth requirements can and typically do vary over time. The quality of service or "QoS" for the DAMA connection is established when the CPE connection is initially established with the base station. Therefore, the base station has the ability to access or "look-up" the QoS for any DAMA service that it is currently accommodating.

As described above, in accordance with the present invention, the CPEs 110 have a number of different techniques available to them for communicating bandwidth request messages to their associated base stations. One such technique is by transmitting a bandwidth request message in response to being polled by a base station. In accordance with the polling technique taught by the present invention, the base station allocates bandwidth to selected CPEs specifically for the purpose of making bandwidth requests. The bandwidth allocations may be to individual CPEs or to groups of CPEs. As described in more detail below in the sub-section that describes the group polling technique, allocations to groups of CPEs define bandwidth request contention slots that are used in resolving bandwidth request collisions. Advantageously, the bandwidth allocations are not made in the form of explicit messages, but rather they are made in the form of bandwidth allocation increases in the transmitted map describing the uplink sub-frame 400 (FIG. 4). Polling is performed on a per-CPE basis, bandwidth is requested on a per-connection-ID basis, and bandwidth is allocated on a per-CPE basis. These concepts are described in more detail below.

Reservation-Based Polling Technique (Individual Polling)

In accordance with the present inventive method and apparatus, when a CPE is polled individually, no explicit message is transmitted to poll the selected CPE. Rather, the CPE is allocated bandwidth in the uplink sub-frame map that is sufficient to allow the CPE to respond with the bandwidth request. Specifically, the base station allocates bandwidth in the CPE scheduled data block 406 (FIG. 4) for the selected CPE that is sufficient to allow the selected CPE to respond with a bandwidth request message. If the selected CPE does not require more bandwidth, it returns a request for zero bytes. A zero byte request (rather than no request) is used in the individual polling process because explicit bandwidth for a reply is allocated.

In accordance with the present invention, only inactive CPEs and active CPEs that explicitly request to be polled are eligible for individual polling. Active CPEs that do not set their respective "poll-me" bits in the MAC packet header will not be polled individually. These restrictions are imposed upon the bandwidth request process by the present invention and they advantageously save bandwidth compared with polling all of the CPEs individually. In one embodiment of the present invention, active CPEs respond to polling using the modulation scheme currently in use. However, inactive CPEs may respond using a QAM-4 or similarly robust modulation scheme to ensure that their transmission is sufficiently robust to be detected by the base station even under adverse environmental conditions.

The present invention advantageously ensures timely responses to requests for more bandwidth for a constant bit rate service such as a channelized T1 service in which channels may be added or dropped dynamically. To ensure that the base station responds quickly to requests for more bandwidth for a constant bit rate service, the uplink bandwidth allocated to a constant bit rate service that is not currently operating at a maximum rate is made sufficiently large to accommodate the service's current rate and a bandwidth request.

Figure 5:
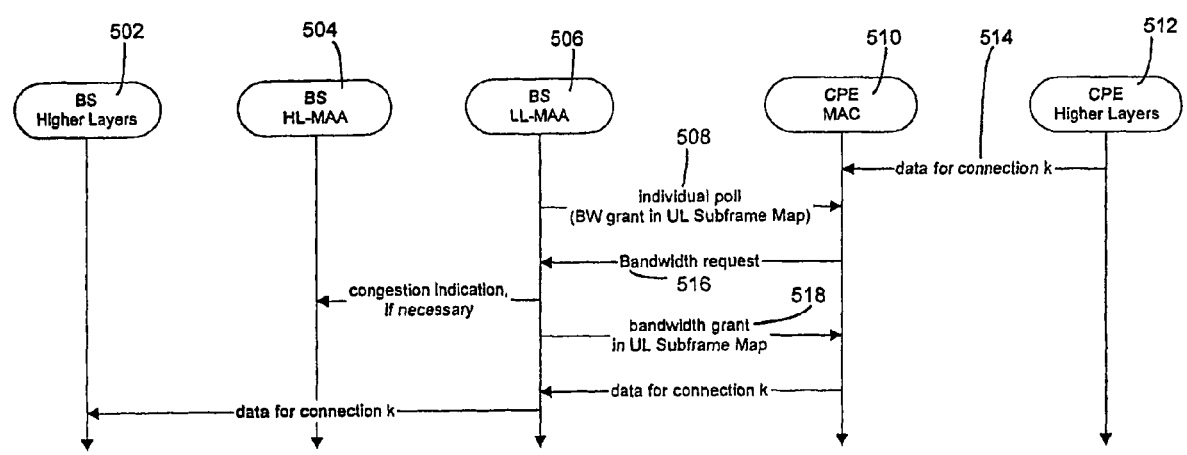
FIG. 5 is a flow diagram showing the information exchange sequence used in practicing the individual polling technique of the present invention.

The information exchange sequence for individual polling is shown in the flow diagram of FIG. 5. As shown in FIG. 5, the base station preferably has several layers of control mechanisms or protocol stacks 502, 504 and 506 that control, among other things, the bandwidth request and allocation process. The base station MAC is sub-divided into two sub-domains: (1) the HL-MAA MAC domain 504 and the LL-MAA Mac domain 506. The LL-MAA MAC domain spans exactly a physical channel. Each physical channel requires an instance of the LL-MAA MAC domain. The HL-MAA MAC domain spans multiple physical channels, typically all in the same sector. A MAC domain comprises an HL-MAA MAC domain and the LL-MAA MAC domains associated with the physical channels within the HL-MAA MAC domain.

As shown in FIG. 5, the base station individually polls (as indicated by control arrow 508) a CPE by allocating bandwidth sufficient for the CPE to respond with a bandwidth request message. This bandwidth is allocated in the uplink sub-frame 400. If the CPE MAC 510 determines that there is data to be sent for a selected connection k (typically determined by being instructed by a higher CPE control layer 512 via a control path 514), then the CPE MAC control mechanism issues a bandwidth request 516 to the base station MAC 506. If there is insufficient bandwidth available to the CPE 110 as determined by the base station's LL-MAA 506, the bandwidth request will not be granted. Else, the bandwidth request will be granted and this will be implicitly communicated to the CPE MAC 510 by the base station allocating additional bandwidth to the CPE in the uplink sub-frame 400. This is shown in FIG. 5 via the control path 518. The CPE will then begin transmitting data to the base station over the uplink using the bandwidth that has been allocated to it.

Figure 6:
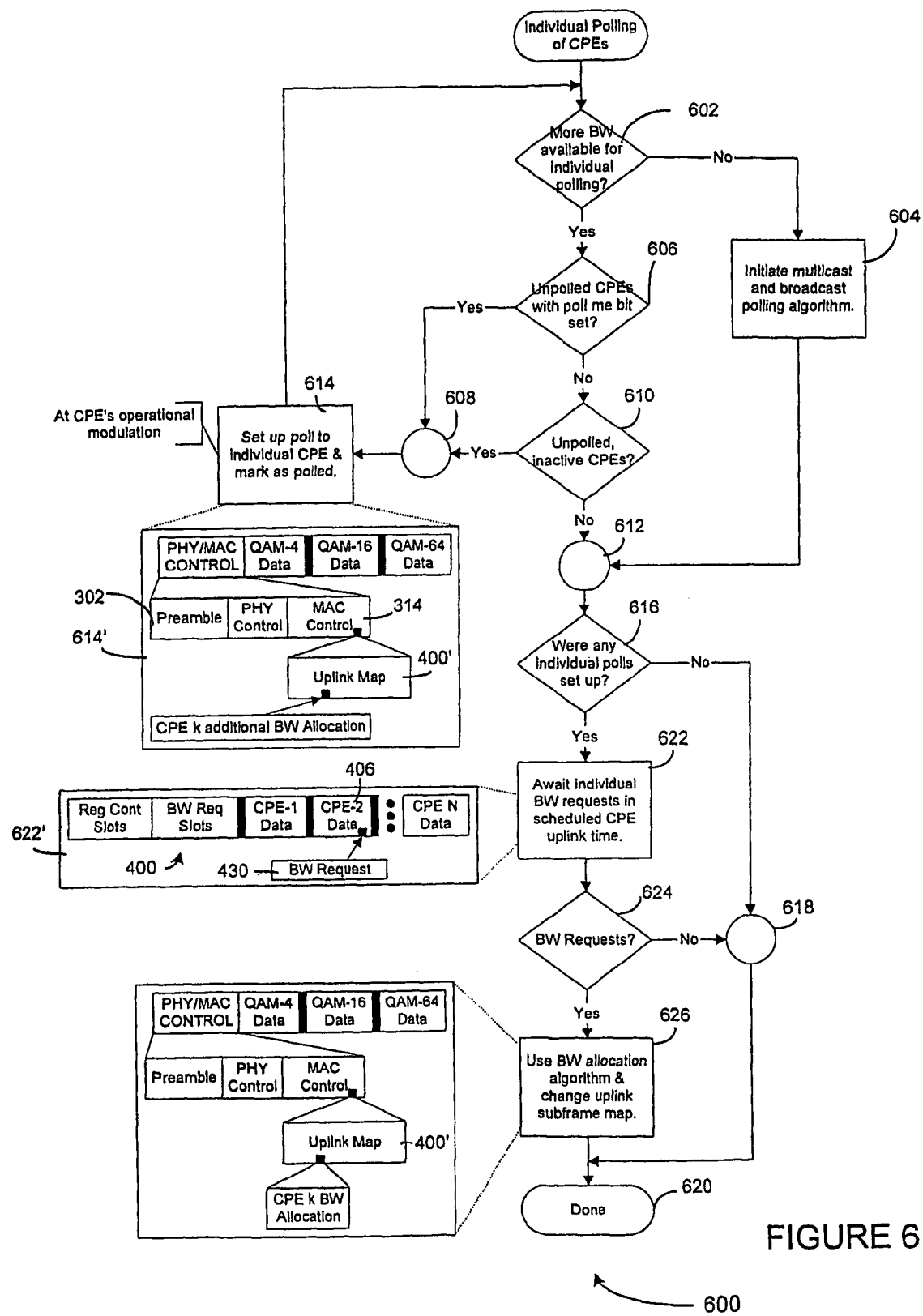
FIG. 6 is a flow diagram showing the individual polling technique of the present invention.

FIG. 6 is a flow diagram showing the individual polling technique 600 provided by the present invention. As shown in FIG. 6, the method starts at decision STEP 602 to determine whether bandwidth is available for the purpose of individually polling the CPEs. If no more bandwidth is available for individually polling the CPEs 110 then the method proceeds to STEP 604 and initiates a multicast or broadcast polling method. This multicast and broadcast polling method is described in detail in the sub-section below. However, if sufficient bandwidth is available for the purpose of individually polling CPEs, the method proceeds to a decision STEP 606 whereat a determination is made whether there are any un-polled active CPEs that have a "poll-me" bit set. If so, the method proceeds to a control point 608. If not, the method proceeds to a decision STEP 610 whereat it determines whether there are any un-polled inactive CPEs present. If so, the method proceeds to the control point 608. If not, the method proceeds to a control point 612.

The present inventive method proceeds from the control point 608 to STEP 614 to individually poll the selected CPE. Thus, the method ensures that only un-polled active CPEs requesting more bandwidth (by setting their respective "poll-me" bits) and inactive CPEs are individually polled. This reduces bandwidth as compared with a polling method that would individually poll all CPEs.

As shown in FIG. 6, at STEP 614 the base station initiates the polling of the selected CPE and marks the CPE as polled. This is shown diagrammatically in FIG. 6 in the caption box 614'. The caption box 614' of FIG. 6 shows the downlink sub-frame map 300 described above in FIG. 3. The MAC control portion 314 of the MAC frame control header 302 preferably includes an uplink sub-frame map 400'. The uplink sub-frame map 400' is communicated to the CPE MAC when the base station transmits this information to the CPE via the downlink. As shown in FIG. 6, and responsive to the polling STEP 614, the base station MAC allocates additional bandwidth to the selected CPE (in FIG. 6 this CPE is referred to as CPE "k") in the uplink. This increased bandwidth allocation is communicated to the CPE k via the uplink sub-frame map 400'. Thus, no additional bandwidth is needed to respond to the need to poll the selected CPE.

As shown in FIG. 6, the method then returns to the decision STEP 602 to determine whether there is more bandwidth available for individually polling the CPEs. When it is determined (at the decision STEPS 606 and 610, respectively) that there are no active CPEs having a poll-me bit set and that there are no un-polled inactive CPEs present, the method proceeds to a decision STEP 616. At the decision STEP 616, the method determines whether any individual polls were performed. If not, the method proceeds to a control point 618 and the method subsequently terminates at the termination step 620. However, if individual polls were performed, the method proceeds to a STEP 622 to await the individual bandwidth requests from the CPE that was polled (e.g., CPE "k"). As shown in the caption 622' of FIG. 6, this bandwidth request 430 is generated by the polled CPE (e.g., CPE "k") during the CPE scheduled data block 406 scheduled for the selected CPE in the uplink sub-frame 400. In one embodiment, all data includes a header that indicates the type of data being transmitted. For example, in this embodiment, control messages have associated CPE-unique connection identifiers that are assigned to them when the CPE registers. The structure of the control messages allows a base station to determine that a control message is a bandwidth request.

As shown in FIG. 6, the method proceeds from STEP 622 to a decision STEP 624 to determine whether any bandwidth requests were received. If not, the method terminates. However, if so, the method proceeds to a STEP 626 whereat a bandwidth allocation method is initiated. As described in more detail below the base station uses a bandwidth allocation method to allocate bandwidth to the requesting CPE. In one embodiment, a self-correcting bandwidth request/grant protocol is also used. Details of the self-correcting bandwidth request/grant protocol are described in more detail below with reference to FIGS. 15a and 15b. In another embodiment, the bandwidth allocation method uses "padding packets" to improve bandwidth allocation efficiencies in wireless communication systems. This embodiment is described in more detail below with reference to FIG. 16. The bandwidth allocation is indicated to the CPE by making appropriate changes to the uplink sub-frame map 400'. The method then terminates at STEP 620.

Contention-Based Polling Technique (Multicast and Broadcast Polling)

As described above with reference to STEP 604 of the individual polling method of FIG. 6, if there is not sufficient bandwidth available for the purpose of individually polling the CPEs, the present invention may be used to poll the CPEs in multicast groups and a broadcast poll may be issued by the base station. Also, if there are more inactive CPEs than there is bandwidth available to individually poll them, some CPEs may be polled in multicast groups and a broadcast poll may be issued.

In accordance with one embodiment, the addressing of CPEs is preferably performed as follows: each CPE is assigned a unique permanent address (e.g., in one embodiment the CPE has a 48-bit address) that is used in the registration process; and each CPE is also given a basic connection ID (e.g., in one embodiment the CPE is given a 16-bit basic connection ID and a 16-bit control connection ID during the registration process). Each service that is provisioned for a selected CPE is also assigned a connection ID. Connection IDs are generated by the base station MAC (specifically, by the base station HL-MAA) and are unique across an HL-MAA MAC domain. The basic connection ID that is assigned when the CPE is registered with a base station is used by the base station MAC and the CPE MAC to exchange MAC control messages between the CPE and the base station. The control connection ID (also assigned during registration) is used by the base station and the CPE to exchange control and configuration information between the base station and the CPE higher levels of control.

In accordance with one embodiment, certain connection IDs are reserved for multicast groups and broadcast messages. Of all of the addresses available a portion of them are preferably reserved for multicast use. For example, in one embodiment of the present invention, if the four most-significant bits of the connection ID are set to logical ones (hex "Fxxxx") the address is interpreted as being set aside for multicast use. In this embodiment, a total of 4K distinct multicast addresses are available. One example of such a multicast use is for the distribution of a video service. In one preferred embodiment, the connection ID used to indicate a broadcast to all stations is (0xFFFF) (i.e., all 16 bits are set to a logical one).

Figure 7:
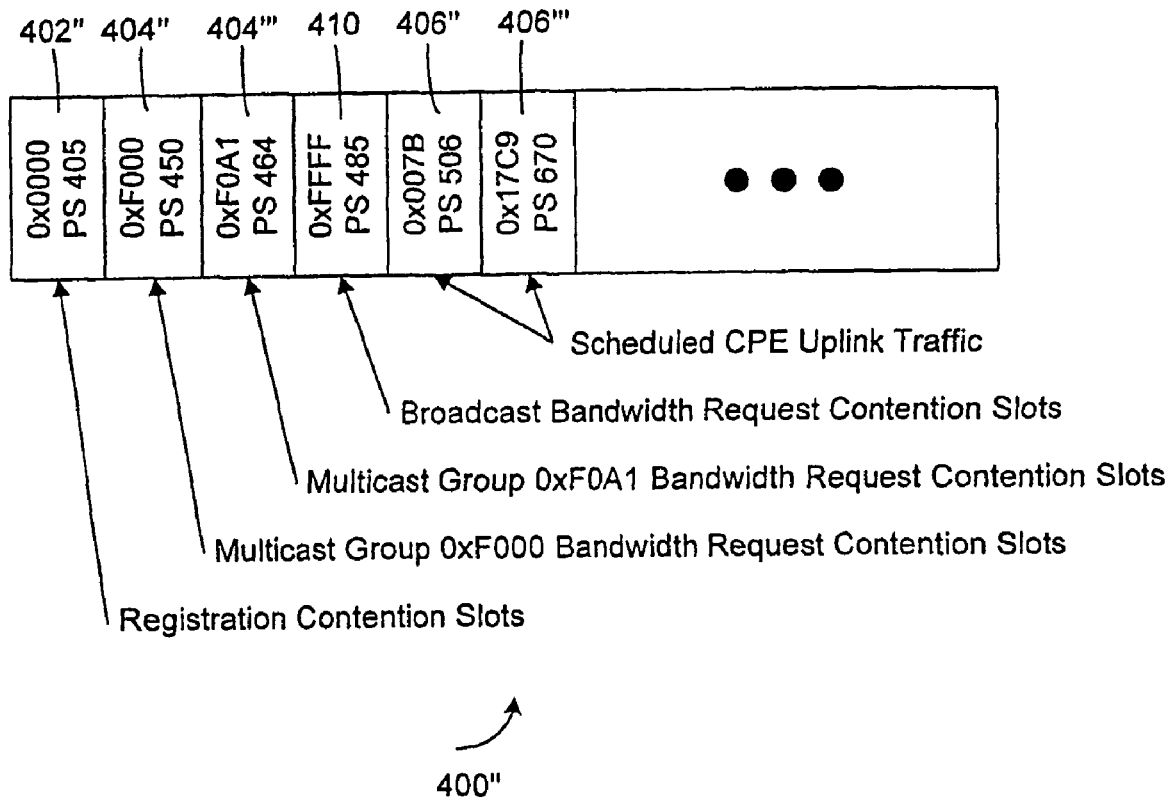
FIG. 7 shows an exemplary uplink sub-frame map that is used to facilitate the present multicast/broadcast bandwidth allocation technique.

Similar to the individual polling technique described above with reference to FIGS. 5 and 6, the multicast polling message is not explicitly transmitted by the base station to the CPE. Rather, the multicast poll message is implicitly transmitted to the CPE when the base station allocates bandwidth in the uplink sub-frame map. However, rather than associating allocated bandwidth with a CPE's basic connection ID as done when performing an individual poll, the base station associates the allocated bandwidth to a multicast or broadcast connection ID. This multicast/broadcast bandwidth allocation is shown in the multicast/broadcast uplink sub-frame map 400" shown in FIG. 7. It is instructive to compare the uplink sub-frame 400 (FIG. 4) used by the base station when individual polling the CPEs with the uplink sub-frame map 400" of FIG. 7. FIG. 7 shows the uplink sub-frame map which is transmitted in the MAC control portion of the downlink.

As shown in FIG. 7, the multicast/broadcast uplink sub-frame map 400" used includes registration contention slots 402" that map the registration contention slots 402 of FIG. 4. However, rather than associating allocated bandwidth with a selected CPE's basic connection ID, the allocated bandwidth is associated with a reserved registration ID. As shown in FIG. 7, the uplink sub-frame map 400" preferably includes a plurality of multicast group bandwidth request contention slots 404", 404''', etc. The uplink sub-frame map 400" also includes broadcast bandwidth request contention slots 410. Finally, similar to the uplink sub-frame of FIG. 4, the uplink sub-frame map used by the present invention to initiate multicast or broadcast polls includes a plurality of CPE scheduled data blocks 406", 406''', etc., that are used to transport uplink traffic data.

In accordance with the present inventive method and apparatus, when a poll is directed to a multicast or broadcast connection ID, CPEs belonging to the polled group request bandwidth using the bandwidth request contention slots (either the multicast contention slots for the group specified or the broadcast bandwidth request contention slots 410) allocated in the uplink sub-frame map 400". In order to reduce the likelihood of collisions only CPE's needing bandwidth are allowed to reply to multicast or broadcast polls. Zero-length bandwidth requests are not allowed in the bandwidth request contention slots. In one embodiment, CPEs transmit the bandwidth requests in the bandwidth request contention slots (e.g., contention slots 404) using QAM-4 modulation. In this embodiment, the contention slots are sized to hold a 1-PS preamble and a bandwidth request message. Due to physical resolution characteristics, the message requires 1 PI (or 6 PS) using QAM-4 modulation. In this embodiment, multiple bandwidth request messages from the same CPE fit in a single bandwidth request contention slot without increasing the bandwidth utilization or the likelihood of collisions occurring. This allows the same CPE to make multiple bandwidth requests in the same slot.

If an error occurs when performing either a multicast or broadcast poll (such as the detection of an invalid connection ID) the base station transmits an explicit error message to the CPE. If the base station does not respond with either an error message or a bandwidth allocation within a predefined time period, the CPE will assume that a collision occurred. In this case the CPE uses a selected pre-defined contention resolution process. For example, in one preferred embodiment, the CPE uses the well known "slotted ALOHA" contention resolution process to back off and try at another contention opportunity.

Contention Resolution Process

Contention is necessary when there is insufficient time to poll all of the CPEs individually within a suitable interval. The base station is able to define contention periods both for multicast groups and also for all CPEs generally (i.e., broadcast). After CPE scheduled data, control messages, and polling are allowed for, the base station allocates all unused time in the upstream part of the TDD frame to contention, either for bandwidth requests or for registration purposes. Typically the bandwidth request interval will be many PIs long (e.g., 1 PI=6 PS using QAM-4 modulation). The CPEs must transmit their requests at a random time (on burst boundaries) within this interval to reduce the likelihood of collisions occurring.

In accordance with the present invention, a CPE needing to transmit in a request interval preferably randomly selects a PI within the interval, and makes a request in the associated starting PS. This randomization minimizes the probability of collisions. A collision is presumed if there is no response from the base station to the request within a pre-defined time period. If the base station does not respond within the pre-defined time period the collision resolution process of the present invention is initiated.

One embodiment uses the following resolution process: Assuming that the initial backoff parameter is i and that the final backoff parameter is f, On the first collision, the CPE waits a random interval between zero and $2^i$ contention opportunities and then tries again.

If another collision occurs, then the interval is doubled and the CPE tries again, repeating until the interval $2^f$ is reached.

If the CPE is still unsuccessfull, an error is reported to the system controller and the contention process is aborted. Other contention resolution mechanisms can be used to practice the present invention. For example, the well-known Ternary tree mechanism could be used to resolve contentions.

Figure 8:
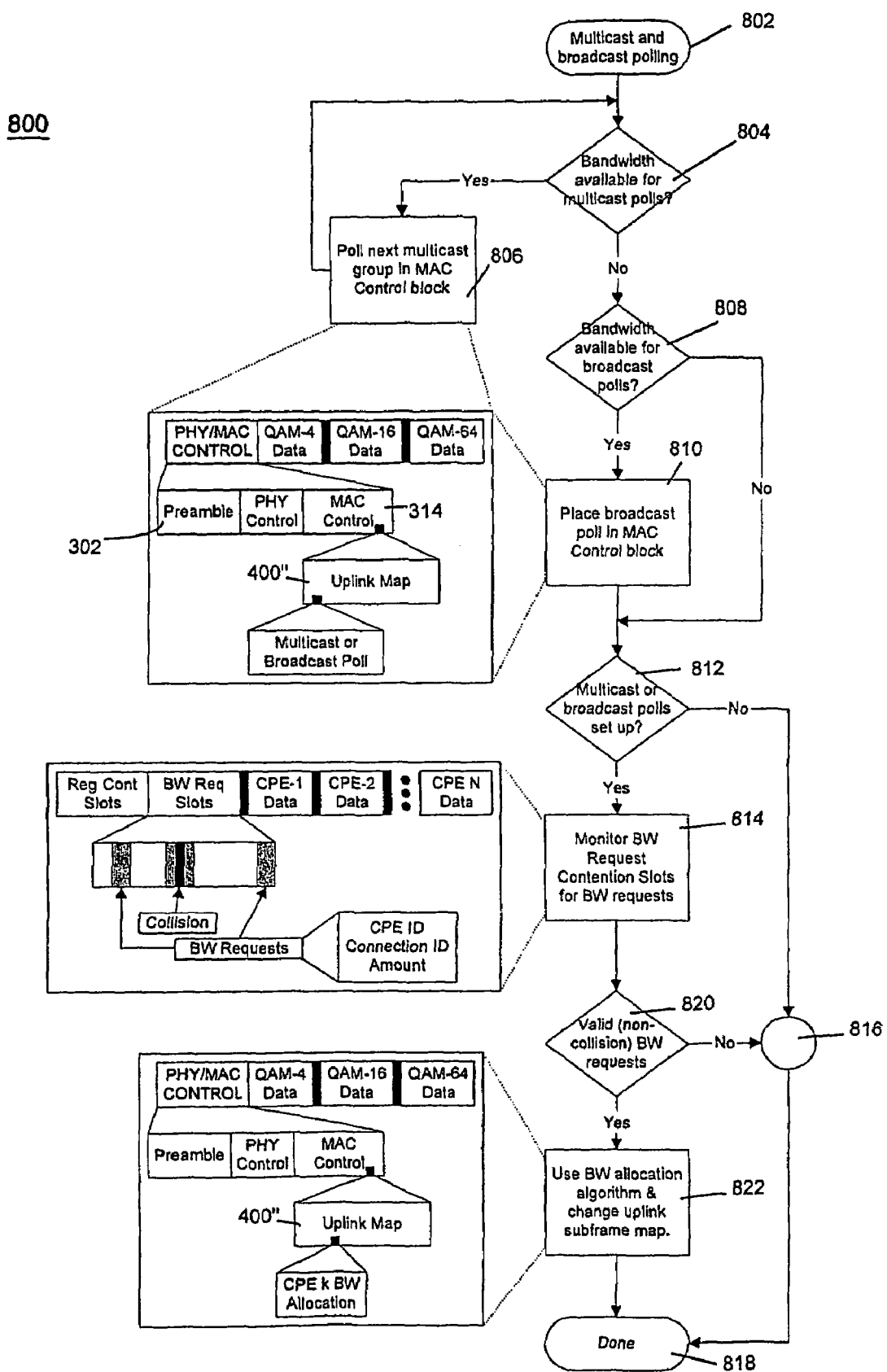
FIG. 8 is a flow diagram showing the multicast and broadcast polling technique of the present invention.

FIG. 8 is a flowchart showing the multicast and broadcast polling method 800 of the present invention. As shown in FIG. 8, the group polling method 800 proceeds from an initial step 802 to a decision STEP 804 whereat the method determines whether there is sufficient bandwidth available for multicast polls. If sufficient bandwidth is available for multicast polls, the method proceeds to a STEP 806 to poll the next multicast group in the MAC control portion 314 of the MAC frame control header 302. However, if there is insufficient bandwidth available to perform a multicast poll, the method proceeds to a decision STEP 808 whereat the method determines whether there is sufficient available bandwidth for performing a broadcast poll. If so, the method proceeds to a STEP 810. If not, the method proceeds to a decision STEP 812.

As shown in FIG. 8, at the STEP 810 a broadcast poll is initiated by placing the broadcast poll in the MAC control portion 314 of the MAC frame control header 302. Similar to the individual polling technique, the multicast poll message is implicitly transmitted to the CPE by allocating bandwidth in the uplink sub-frame map 400". The allocated bandwidth is associated with a multicast or broadcast connection ID.

At the decision STEP 812 the method determines whether a broadcast or multicast poll was initiated. If so, the method proceeds to a STEP 814 whereat the method monitors the appropriate bandwidth request contention slots (e.g., as defined by the bandwidth contention slot descriptions 404", 404'", and the broadcast bandwidth request contention slot descriptions 410 of FIG. 7). If no broadcast or multicast poll was initiated, the method proceeds to control point 816 and subsequently terminates at a termination STEP 818.

The method proceeds from the monitoring STEP 814 to a decision STEP 820 to determine whether valid (i.e., non-colliding) bandwidth requests were detected. If no valid bandwidth requests were detected at STEP 820, the method proceeds to the control point 816 and terminates at termination STEP 818. However, if the method detects valid bandwidth requests, the method proceeds from STEP 820 to STEP 822. At STEP 822 the method uses a convenient bandwidth allocation algorithm to allocate bandwidth to the CPE that requested bandwidth. The preferred bandwidth allocation algorithm is described below in more detail with reference to FIGS. 12-13. The bandwidth is allocated in the uplink sub-frame map 400" as shown in FIG. 8.

Poll—Me Bit

As described above with reference to FIGS. 3-8, and in accordance with the present invention, a currently active CPE sets a "poll-me" bit or a "priority poll-me" in a MAC packet in order to indicate to the base station that it requires a change in bandwidth allocation. For example, in one embodiment of the present invention, a selected CPE requests a poll by setting a poll-me ("PM") bit in the MAC header. Similarly, in accordance with the present invention, a selected CPE sets a priority poll-me ("PPM") bit in the MAC header in order to indicate that a priority poll is desired.

Figure 9:
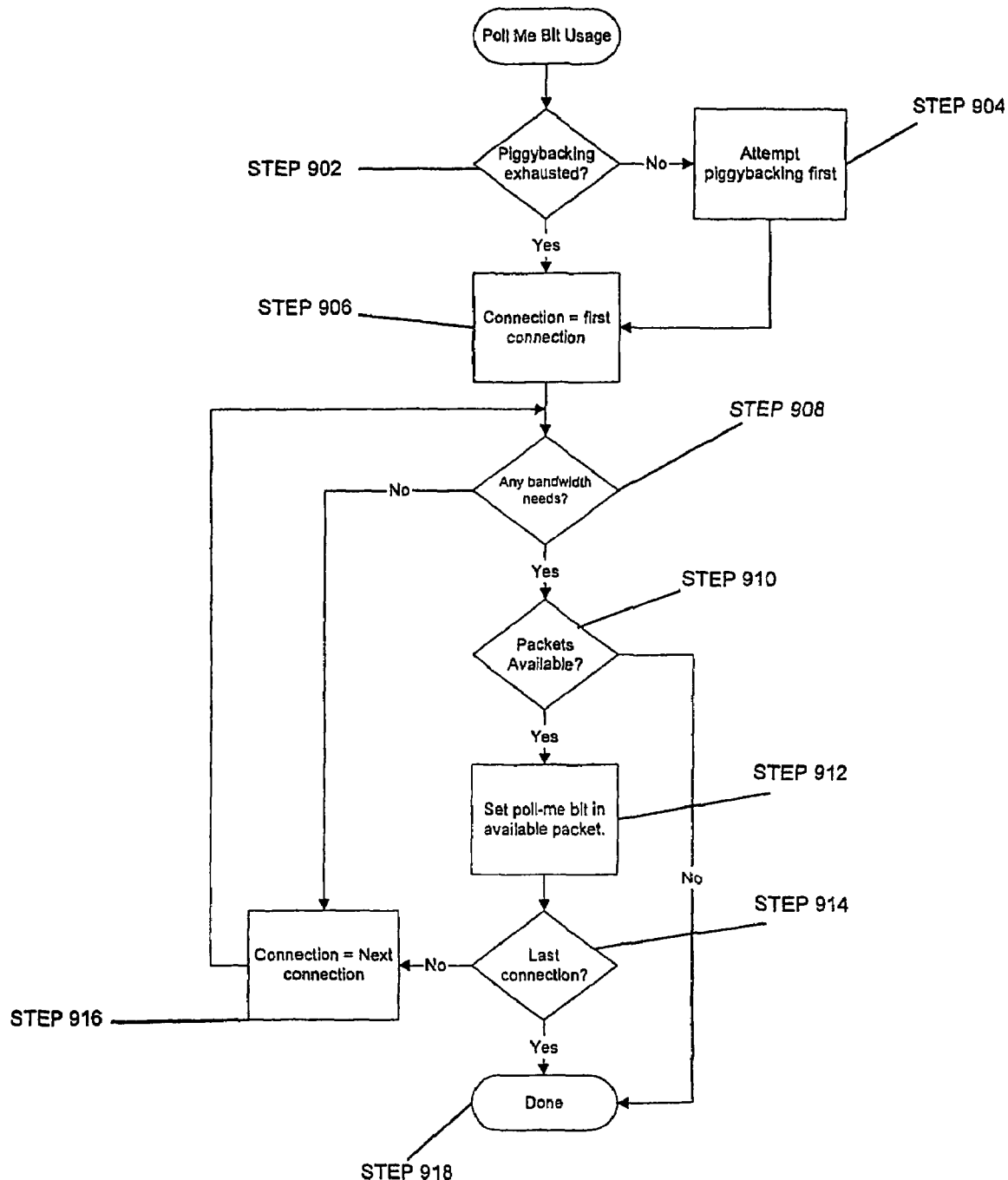
FIG. 9 is a flow diagram showing use of a "poll-me" to stimulate polling of a CPE in accordance with the present invention.

In order to reduce the bandwidth requirements associated with individually polling every active CPE, the active CPEs are individually polled if and only if one of the poll-me bits is set by the CPE. When the base station detects a request for polling (when the CPE sets its poll-me bit), the individual polling technique shown in FIG. 9 is activated in order to satisfy the request. The procedure by which a CPE stimulates a base station to poll the CPE is shown in FIG. 9. In an alternative embodiment, multiple packets having "poll-me" bits set indicate that the CPE needs to make bandwidth allocation requests for multiple connections.

FIG. 9 is a flow chart that shows how the poll-me bit is used to stimulate polling. As shown in FIG. 9, the method first determines at a decision STEP 902 whether the piggybacking technique described in more detail below has been exhausted. If not, the method proceeds to STEP 904 and attempts to perform "piggybacking" first. The method then proceeds to a STEP 906 whereat the connection is set equal to a first connection. In this manner, the poll-me bits are scanned for each connection within the CPE. The method shown in FIG. 9 then proceeds to a decision STEP 908 to determine whether any bandwidth needs exist. If not, the method proceeds to a STEP 916 and scans for the next connection. If a bandwidth need exists, the method proceeds to a decision STEP 910. At STEP 910 the method determines whether any more packets are available for accommodating the poll-me bit. If not, the method terminates at the STEP 910. However, if packets are available, the method proceeds to a STEP 912 and sets a poll-me bit in an available packet.

Figure 10:
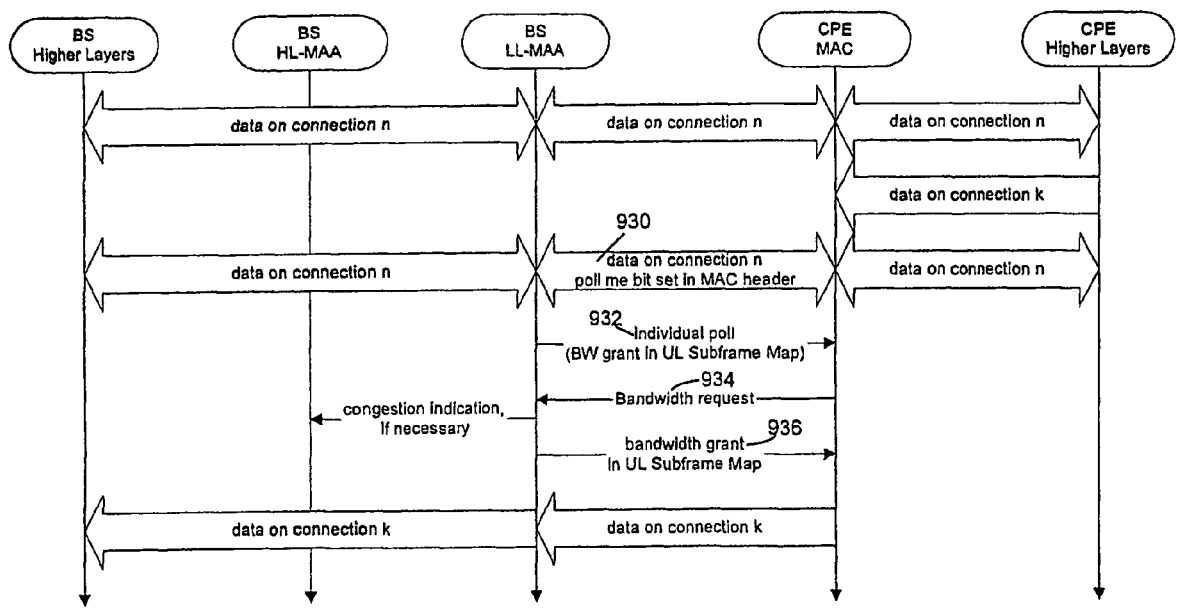
FIG. 10 shows the message sequence that is used by the present invention in requesting polls using the "poll-me" bit.

FIG. 10 shows the message sequence that is used by the present invention in requesting polls using the "poll-me" bit described above. As shown in FIG. 10 at data connection 930, the CPE initiates a polling sequence by setting its associated poll-me bit in the MAC header. The base station MAC responds via data message 932 by individually polling the selected CPE. This response is made by allocating bandwidth to the selected CPE in the uplink sub-frame map as shown in FIG. 10. The selected CPE subsequently responds with a bandwidth request as shown in communication path 934. In response to the CPE's bandwidth request, the base station grants bandwidth and allocates bandwidth to the CPE in the uplink sub-frame map as shown in communication path 936. The selected CPE then transmits its data to the base station via an associated connection link.

"Piggybacking" Technique

As described above with reference to the present inventive method and apparatus, in order to further reduce overhead bandwidth necessary for the bandwidth allocation process, currently active CPEs may "piggyback" a bandwidth request (or any other control message) on their current transmissions. The CPEs accomplish this piggybacking of bandwidth by using unused bandwidth in TC/PHY packets of existing bandwidth allocations. The procedure for using excess bandwidth in this manner is shown in FIG. 11.

Figure 11:
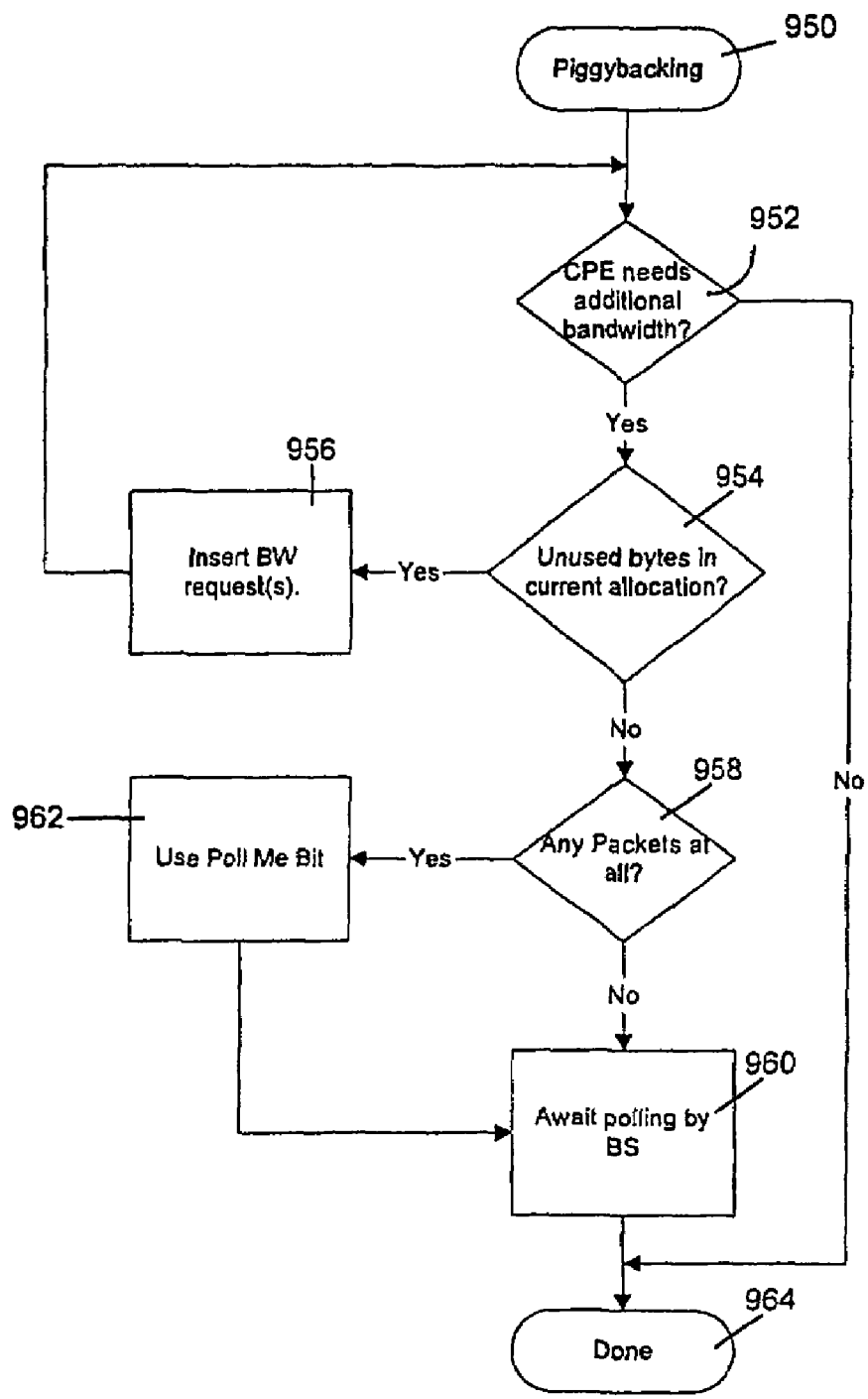
FIG. 11 is a flow diagram showing the bandwidth request piggybacking process of the present invention.

As shown in FIG. 11, the method initiates the piggybacking process at STEP 950. The method proceeds to a decision STEP 952 to determine whether the CPE requires additional bandwidth. If so, the method proceeds to a decision STEP 954, if not, the method proceeds to a termination STEP 964 whereat the method terminates. At the decision STEP 954 the method determines whether any unused bytes exist in the current allocation. If so, the method proceeds to insert bandwidth requests into the unused bytes at STEP 956. If not, the method proceeds to a decision STEP 958. At the decision STEP 958, the method determines whether any packets at all are allocated to the CPE. If there are no packets found at the decision STEP 958, the method proceeds to STEP 960. However, if packets are allocated, the method proceeds to a STEP 962 whereat the CPE sets its poll-me bit. The method then proceeds to the STEP 960 whereat the CPE awaits polling by the associated base station. The method then terminates at the STEP 964.

Bandwidth Allocation

As described above, the base station MAC is responsible for allocating the available bandwidth of a physical channel on the uplink and the downlink. Within the uplink and downlink sub-frames, the base station MAC scheduler allocates the available bandwidth between the various services depending upon the priorities and rules imposed by their quality of service (QoS). Additionally, the higher control sub-layers of the base station MAC allocate across more than one physical channel.

Downlink Bandwidth Allocation—One Embodiment

Figure 12:
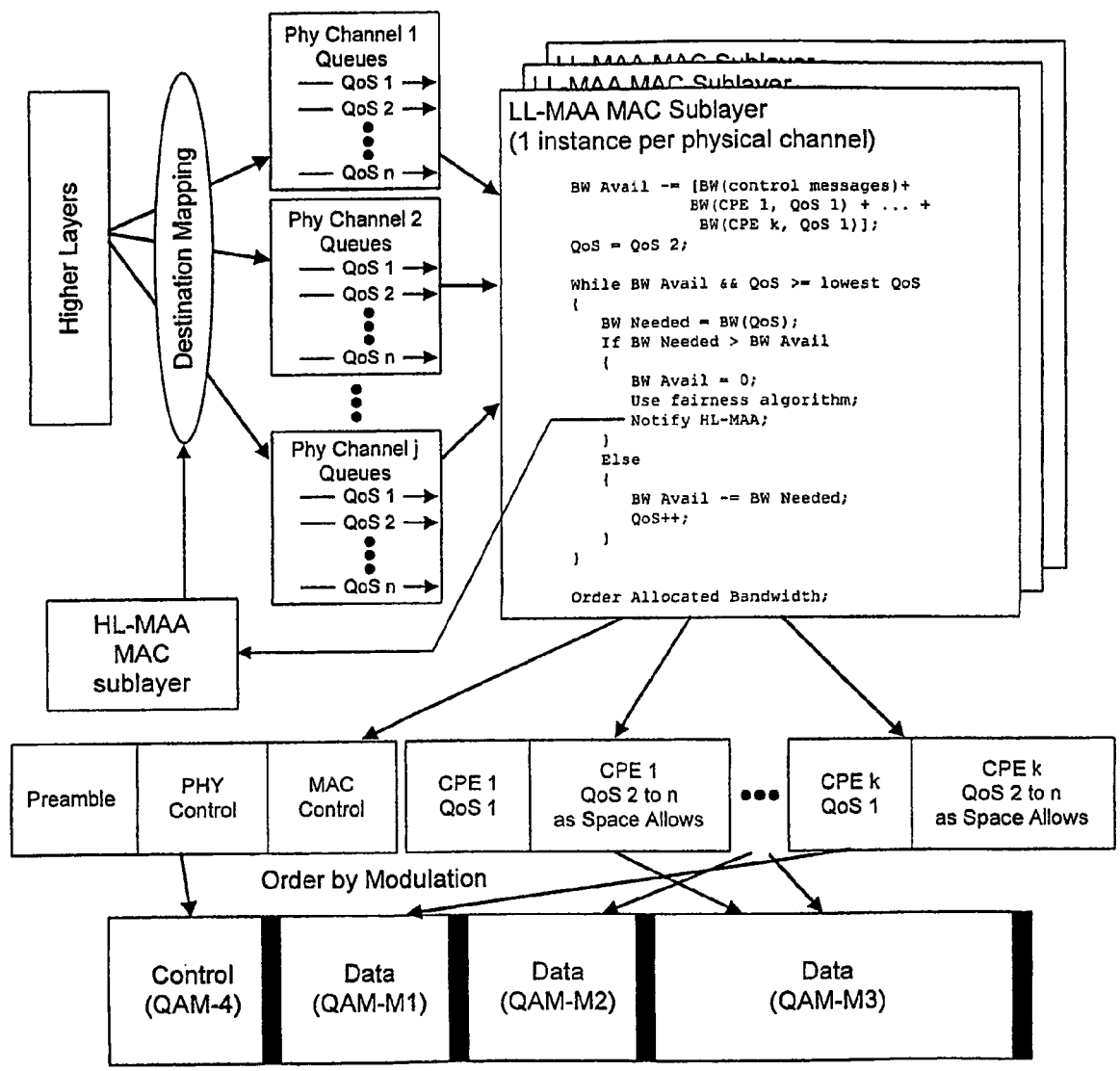
FIG. 12 shows the downlink bandwidth allocation method used by the present invention.

The downlink bandwidth is allocated as shown in FIG. 12. The base station MAC maintains a set of queues for each physical channel that it serves. Within each physical channel queue set, the base station maintains a queue for each QoS. The queues hold data that is ready to be transmitted to the CPEs present on the physical channel. The higher layers of the base station protocol stack are responsible for the order in which data is place in the individual queues. The base station higher control layers are free to implement any convenient fairness or traffic shaping algorithms regarding the sharing of access between connections at the same QoS, without impacting the base station lower MAC control layers. Once data is present in the queues it is the responsibility of the base station lower levels of control (e.g., the BS LL-MAA of FIGS. 5 and 10) to allocate bandwidth based on the QoS.

In one embodiment of the present invention, in determining the amount of bandwidth to allocate at a particular QoS for a particular CPE, the base station takes into account the QoS, modulation, and the fairness criteria used to keep an individual CPE from using up all available bandwidth. Bandwidth is preferably allocated in QoS order. If there is a queue that cannot be transmitted entirely within a particular TDD frame, a QoS specific fairness algorithm, such as fair-weighted queuing, is used within that queue. Each connection is given a portion of the remaining available bandwidth based upon its relative weight. The derivation of weights is QoS-dependant. For example, ATM traffic may be weighted based upon contractual bandwidth limits or guarantees, while IP connections may all receive identical weights. Once the bandwidth is allocated the data is transmitted in a manner whereby the data is sorted by modulation type.

Uplink Bandwidth Allocation—One Embodiment

Figure 13:
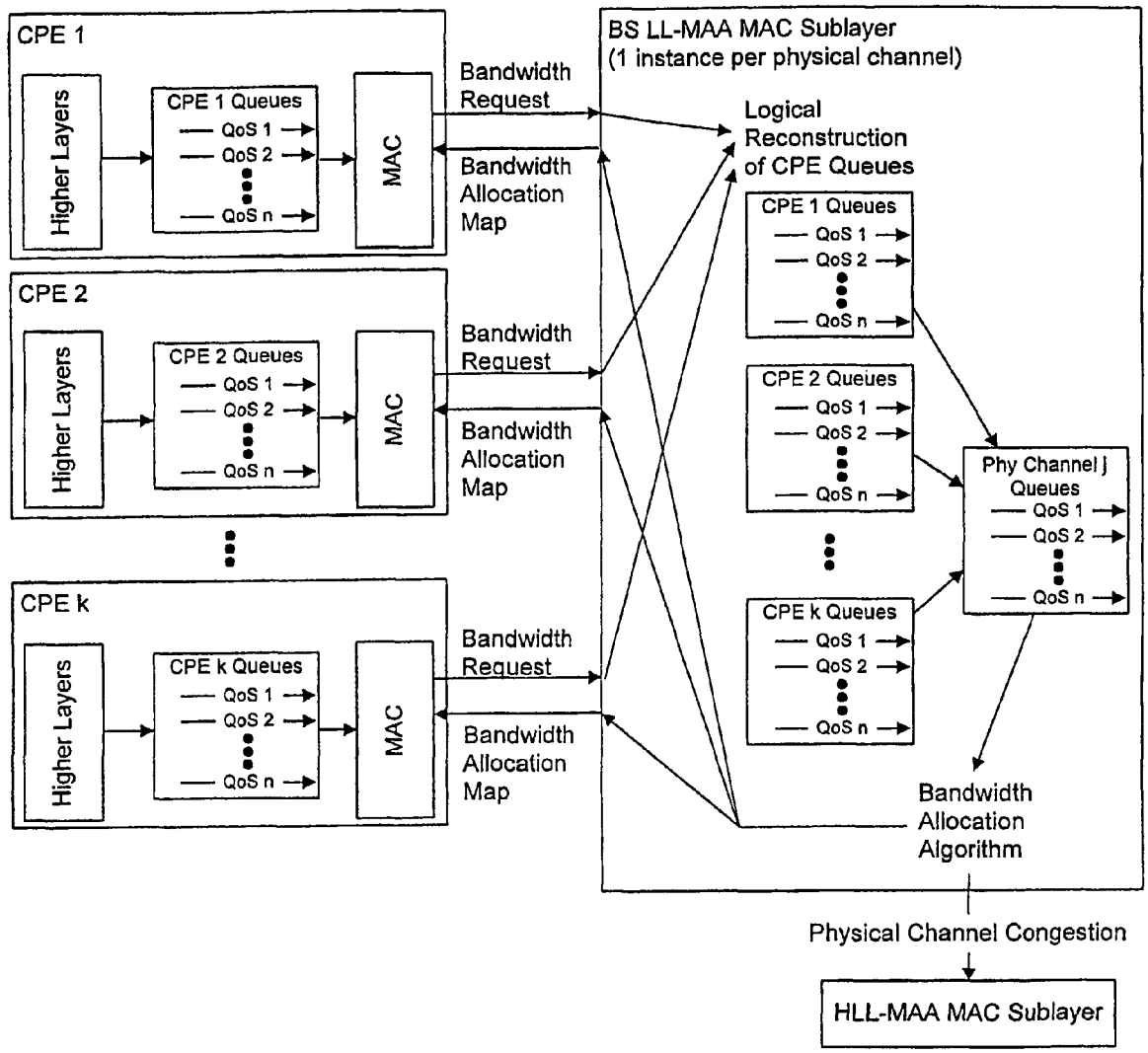
FIG. 13 shows the uplink bandwidth allocation method used by the present invention.

The uplink bandwidth allocation method is very similar to the downlink bandwidth allocation method described above with reference to FIG. 12. However, rather than being maintained by the base station, the data queues are distributed across and maintained by each individual CPE. Rather than check the queue status directly, the base station preferably receives requests for bandwidth from the CPEs using the techniques described above with reference to FIGS. 3-11. Using these bandwidth requests, the base station reconstructs a logical picture of the state of the CPE data queues. Based on this logical view of the set of queues, the base station allocates uplink bandwidth in the same way as it allocates downlink bandwidth. This uplink bandwidth allocation technique is shown in FIG. 13.

As described above, the bandwidth allocated to any selected CPE is transmitted to the selected CPE in the form of bandwidth being allocated in the uplink sub-frame map. Starting at a point in the TDD, the uplink sub-frame map allocates a certain amount of bandwidth to the selected CPE. The selected CPE then allocates this bandwidth across its connections. This allows the CPE to use the bandwidth in a different manner than requested if it receives higher priority data while awaiting the bandwidth allocation. As described above, the bandwidth allocations are in a constant state of change owing to the dynamic nature of bandwidth requirements. Consequently, a selected CPE may receive unsolicited modifications to the bandwidth granted on a frame-by-frame basis. If the selected CPE is allocated less bandwidth for a frame than is necessary to transmit all waiting data, the CPE must use the QoSs and fairness algorithms to service its queues. The CPE may "steal" bandwidth from lower QoS connections to piggyback request for more bandwidth using the piggybacking technique described above. TDM connections not already at maximum bandwidth are allocated enough extra bandwidth in the uplink to piggyback a request for additional bandwidth.

QoS Specific Fairness Algorithms

Data for transmission on the uplink and the downlink is preferably queued by quality of service (QoS) designations. The data is transmitted in order of a QoS queue priority as described above. As the queued data is transmitted, there may be a QoS queue for which there is insufficient bandwidth to transmit all queued data during the current TDD frame. When this situation occurs, a QoS specific fairness algorithm is initiated to ensure fair handling of the data queued at that QoS. There are 3 basic fairness algorithms that can be implemented: (1) Continuous Grant; (2) Fair-weighted queuing; and (3) Round Robin.

The MAC preferably does not police connections for bandwidth usage. Policing should be performed by higher control layers. The MAC assumes that all pending data has met contractual restrictions and can be transmitted. Continuous Grant queues have the simplest fairness algorithm. All data in these queues must be sent every TDD frame. Insufficient bandwidth indicates an error in provisioning.

Fair Weighted Queuing

Fair weighted queuing requires that all connections at a given QoS have a weight assigned to them to determine the percentage of the available bandwidth they are eligible to receive. This weight value is preferably derived from one of three data rate parameters, depending upon the contractual parameters of the provisioned connection. These three parameters are: (1) Data Pending; (2) Guaranteed Rate; and (3) Average Rate.

Real-time VBR connections are established as DAMA connections with fair-weighted queuing based upon data pending. For a QoS queue of this type in a TDD frame having insufficient bandwidth to transmit all of the data in the queue, a weight for each connection in the queue is determined. In one embodiment, this weight is the amount of data pending for the connection expressed as a percentage of the total data pending in the queue. Because the amount of data pending is dynamic, the weights for these types of queues must be determined every TDD frame where there is insufficient bandwidth to send all data in the affected queue.

For DAMA connections contracted at a guaranteed rate the weights are calculated based on the guaranteed rate. In this case, the weight preferably is expressed as a percentage of the total guaranteed rate of all connections with data pending in the queue. Because the guaranteed rate is provisioned the weights need not be determined each TDD frame where they are used. Rather, the weights for a queue are only determined when there is a provisioning change (i.e., a new connection, a change in connection parameters, or a connection termination) for one of the connections in the queue.

For DAMA connections contracted at an average rate the weights are preferably calculated based on the average rate. The weight is the average rate expressed as a percentage of the total average rate of all connections with data pending in the queue. Because the average rate is provisioned the weights need not be determined each TDD frame where they are used. Rather, the weights for a queue are only recalculated when there is a provisioning change for one of the connections in the queue.

In all of the cases described above, the granularity of the bandwidth allocations may be too coarse to provide a perfect percentage-based weighted allocation across the connections in the queue. This may result in some queues not receiving any bandwidth in a particular TDD frame. To ensure that the occurrence of this condition is fairly distributed across the connections in the queue, the connection that did not receive bandwidth is given priority the next time the insufficient bandwidth condition exists for the queue. For queues with weights based upon guaranteed or average rates some connections may not have sufficient data pending to use all of the bandwidth that they are entitled to based upon their calculated weight. In these cases, the connection's unused bandwidth is fairly distributed across the connections having excess data pending.

Some QoSs require that data be aged. For queues at these QoSs there is an associated queue of one step higher priority. If data is not transmitted by the provisioned aging parameter, the data is moved to the higher QoS queue and given priority over newer data in the original queue regardless of the relative weights of the connections.

Round Robin

The Round Robin fairness algorithm is used for best effort connections where all connections have equal weight. When insufficient bandwidth exists to transmit all data in the queue in a particular TDD frame connections are allocated bandwidth in a round-robin fashion with each connection receiving a block of bandwidth up to a queue-specific maximum. Connections that did not receive bandwidth are given priority the next time the insufficient bandwidth condition exists.

Bandwidth Allocation Algorithm

For each TDD frame, the base station allocates the downlink portion of the TDD frame and it performs an estimate of the uplink traffic to allocate uplink bandwidth to the CPEs. The CPEs individually allocate their allotted bandwidth across their pending data connections.

Base Station Downlink

As shown in FIG. 2, in one preferred embodiment of the present invention, based on the ATDD split (i.e., the percentage of bandwidth allocated to the uplink and downlink) the base station has some number of the 800 PS in the TDD frame available for downlink transmissions. The downlink bandwidth allocation algorithm preferably proceeds as follows.

First, the base station allocates PSs to the PI for PHY Control and enough PSs for at least 1 PI for the MAC Control. The base station preferably performs uplink bandwidth allocation before downlink bandwidth allocation in order to determine the number of PIs to allocate for the MAC Control. In one preferred embodiment, the PHY Control and MAC Control are always sent using QAM-4 modulation.

For connections with downlink continuous grant data pending, the base station determines the number of PIs required to transmit the data. This number is then converted to PSs as a function of the modulation used for the CPE associated with each connection. For each remaining QoS or until available bandwidth is entirely allocated, the base station determines if there is enough bandwidth to satisfy the entire need of the QoS queue. If so, the base station allocates the required bandwidth. Otherwise, if there is not enough bandwidth to satisfy the queue, the base station implements the queue-specific fairness algorithm described above.

Base Station Uplink

In one preferred embodiment, based upon the ATDD split described above with reference to FIG. 2, the base station has a pre-determined number of PSs in the TDD frame available for uplink transmissions. The base station must maintain an estimate of the data and control messages pending at each QoS for the CPEs that it serves. The base station estimates the data traffic based upon the bandwidth requests received from the CPEs and based upon an observation of actual data traffic.

The base station estimates the uplink control message traffic based upon the protocols currently engaged (i.e., connection establishment, "poll-me" bit usage, etc.) and based upon the base station's polling policy (i.e., individual, multicast, and broadcast). The uplink bandwidth allocation algorithm proceeds as follows.

For connections with uplink continuous grant data pending, the base station preferably determines the number of PIs required to transmit the data. This number is then converted to a number of PSs as determined by the modulation used for the CPE associated with each connection. Continuous grant connections having a current bandwidth that is less than the maximum bandwidth are always allocated uplink bandwidth that is the smaller of: 1) their maximum bandwidth or 2) their current bandwidth plus the bandwidth necessary to send a CG bandwidth change message.

For each remaining QoS, or until available bandwidth is entirely allocated, the base station determines if there is bandwidth sufficient to satisfy the entire need of the QoS queue and it then allocates the required bandwidth. Otherwise, if there is not bandwidth sufficient to satisfy the queue, the base station implements the queue-specific fairness algorithm described above.

CPE Uplink

As described above, for each TDD frame, the CPEs are allocated a portion of the uplink sub-frame in which to transmit their respective data. Because the bandwidth requirements of the CPE may have changed since the base station received the bandwidth request information that it used to allocate the uplink bandwidth, the CPEs themselves are responsible for allocating their allotted bandwidth based upon their current bandwidth requirements. That is, the CPEs are not constrained to distribute allocated bandwidth to their data connections in the same manner that the CPE used in requesting the bandwidth from the base station. The CPE's uplink bandwidth allocation algorithm preferably proceeds as follows.

For connections having uplink continuous grant data pending, the CPE determines the number of PIs that are required to transmit the data. This number is then converted to a PS number based upon the modulation scheme used by the CPE. For each remaining QoS, or until available bandwidth is entirely allocated, the CPE determines if there is bandwidth sufficient to satisfy the entire need of the QoS queue. If so, the CPE allocates the required bandwidth. Otherwise, if there is not bandwidth sufficient to satisfy the queue, the CPE implements the queue-specific fairness algorithm described above.

Exemplary Communication System

Figure 14:
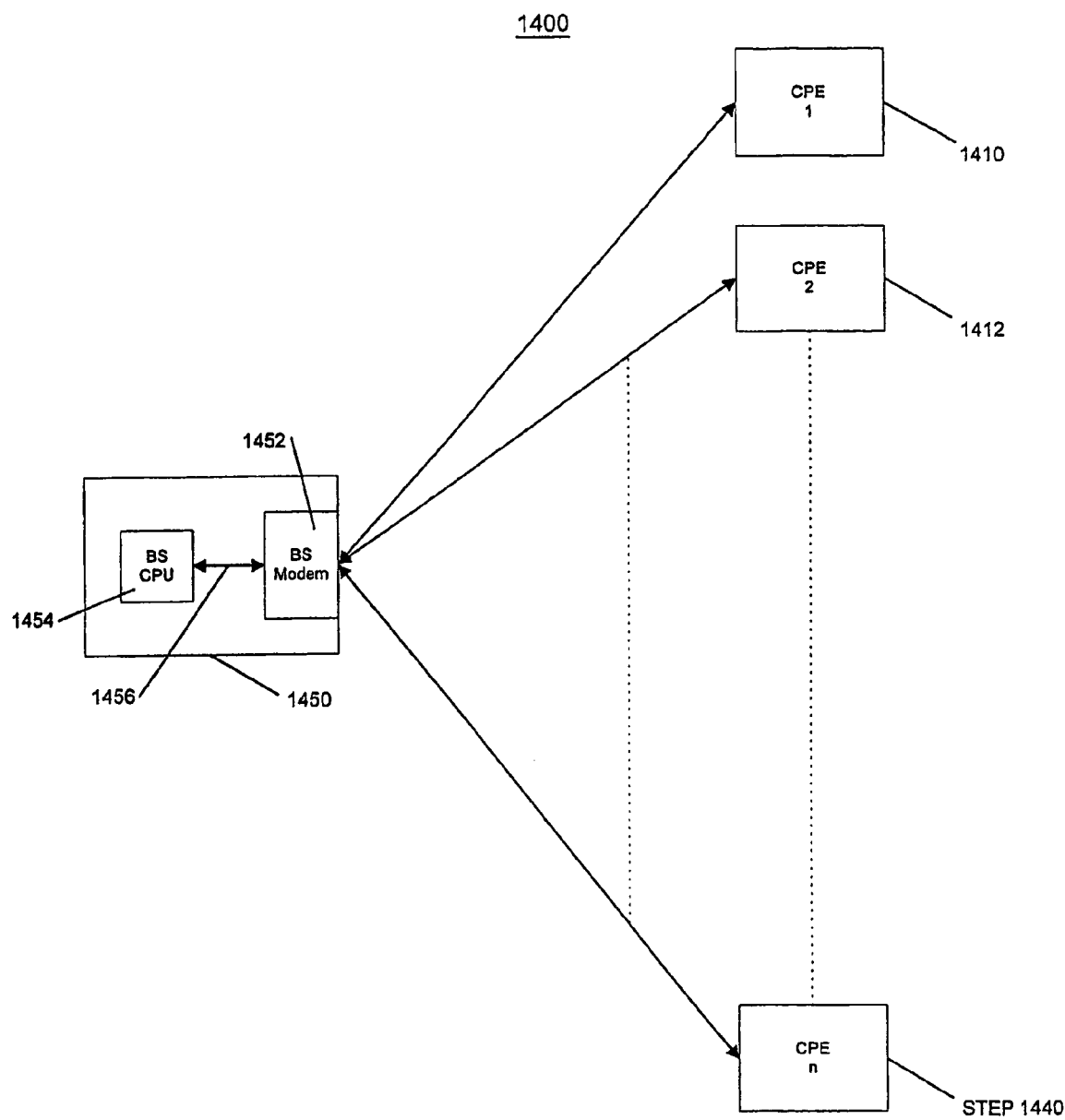
FIG. 14 shows a simplified block diagram of an exemplary communication system adapted for use with embodiments disclosed herein.

An exemplary communication system adapted for use with the bandwidth allocation protocols is now described. FIG. 14 shows a simplified block diagram of an exemplary communication system adapted for use with the embodiments described herein. As shown in FIG. 14, the exemplary communication system 1400 comprises a base station 1450 and a plurality of CPEs 1410-1440. Although only three CPEs are shown in FIG. 14 one skilled in the communication art shall recognize that the base station 1450 is typically associated with hundreds of CPEs. The base station (BS) 1450 comprises a base station modem 1452, a base station CPU 1454 and a CPU/Modem interface 1456.

As shown in FIG. 14, the BS 1450 communicates with the plurality of CPEs 1410-1440 via the BS modem 1452. The BS modem 1452 establishes an uplink and downlink with any of the plurality of CPEs 1410-1440 in a manner well known to one skilled in the communication art. As described above, the BS 1450 transmits information such as bandwidth allocation messages and CG and ATM data to the plurality of CPEs 1410-1440 on the downlink. On the uplink the BS receives information such as bandwidth request messages and CG and ATM data from the plurality of CPEs 1410-1440.

In one embodiment, the exemplary communication system 1400 utilizes "padding packets" and the well-known TDMA multiplexing scheme. In the well-known TDMA multiplexing scheme, the BS 1450 designates a portion of its uplink sub-frame (i.e., bandwidth) to an associated CPE. In accordance with the exemplary communication system 1400, the associated CPE transmits data to the BS 1450 on the uplink. When a CPE does not have enough uplink data to utilize its entire portion of bandwidth, it transmits padding packets to "pad" or fill the unused portion of bandwidth.

The BS modem 1452 and the BS CPU 1454 transmit uplink and downlink data via the CPU/Modem interface 1456. Examples of uplink and downlink data include control messages, bandwidth request messages, bandwidth allocation messages, CG data, DAMA data, padding packets and flag packets. Embodiments of the bandwidth request protocols will now be described.

Self-Correcting Bandwidth Request/Grant Protocol

The self-correcting bandwidth request/grant protocol provides a mechanism for efficiently allocating bandwidth. The self-correcting bandwidth request/grant protocol can be used in both TDD and FDD communication systems. The self-correcting bandwidth request/grant protocol utilizes both incremental and aggregate bandwidth requests. CPEs primarily transmit incremental bandwidth requests followed by periodically transmitting aggregate bandwidth requests. The use of incremental bandwidth requests reduces risks that a base station will erroneously issue duplicate bandwidth allocations to the same CPE for the same connection. Race conditions that may have occurred when using only aggregate bandwidth requests are eliminated by requiring the CPEs to request bandwidth in an incremental manner. However, use of periodic aggregate bandwidth requests (that express the current state of their respective connection queues) allows the bandwidth allocation method and apparatus to be "self-correcting".

The method is self-correcting because errors that may have been introduced due to lost incremental bandwidth requests are corrected by the base stations when the aggregate bandwidth requests are received and processed. Upon receipt of the aggregate bandwidth requests, the base stations reset their records to correctly reflect the current bandwidth requirements of their associated CPEs. Periodic use of aggregate bandwidth requests provides a self-correcting bandwidth allocation protocol yet without the bandwidth overhead (e.g., bandwidth required to transmit acknowledgements) typically associated with the prior art self-correcting protocols (such as the guaranteed delivery protocols).

In wireless communication systems, DAMA services are allocated bandwidth on a demand-assignment basis. When a CPE requires additional bandwidth on a DAMA connection, it transmits a bandwidth request message to its associated base station. Depending upon the mode used by the communication system, the CPE transmits the bandwidth request directed toward either the specific connection or to the QoS class to which the connection belongs. In an exemplary embodiment, the QoS for the connection is established at the time that the connection is established and is subsequently referenced by the base station or the CPE depending upon the mode of operation being used.

In accordance with one embodiment of a communication system adapted for use with the self-correcting protocol, CPEs preserve bandwidth with the assistance of various bandwidth request timers (e.g., bandwidth request timers "MT5" and "MT10", described in more detail below with reference to FIGS. 15a and 15b). The bandwidth request timers are used in these communication systems to prevent the CPEs from requesting bandwidth too frequently. Because the bandwidth request timer values can be varied dynamically based upon certain system characteristics, the bandwidth request timers are considered to be "dynamic." For example, the bandwidth request timer values can be dynamically varied to reflect the current flow of data received via the CPE ports. The bandwidth request timers can also dynamically vary their values based upon the connection priority in the system. In systems using dynamic bandwidth request timers, the CPEs typically use the bandwidth request timers in accordance with the following description.

At the beginning of a data burst, the CPE resets the dynamic bandwidth request timers. During the data burst, the CPE decreases or shortens the bandwidth request timer values (thereby reducing the time period between the transmission of consecutive bandwidth requests) based upon the current data flow and the connection priority of the CPE. The CPEs prevent bandwidth requests from being transmitted too frequently by controlling the bandwidth request timer values. More specifically, the CPEs ensure that the bandwidth request timer values are never decreased below a pre-determined threshold value, thereby ensuring that the bandwidth requests are not transmitted too frequently. One of ordinary skill in the communications art shall recognize that "static" timers can also be used to practice the present invention. Unlike the dynamic timers described above, static timers are not dynamically varied based upon certain system characteristics. Therefore, those skilled in the art shall recognize that the utilization of dynamic bandwidth request timers is not meant to be a limitation as static timers can also be used.

In accordance with one embodiment, the CPE has an option of transmitting a message that contains either the total immediate requirements of the DAMA connection/QoS (i.e., the aggregate bandwidth requirements) or the incremental immediate requirements of the DAMA connection/QoS (i.e., the incremental bandwidth requirements). The CPE primarily transmits an incremental bandwidth request, but periodically (e.g., every fifth request) transmits an aggregate bandwidth request. The incremental bandwidth requests specify the increased or decreased bandwidth requirements for the CPE (i.e., the amount that the bandwidth requirements have changed since the most recent bandwidth request was made). The aggregate bandwidth requirements specify the total immediate bandwidth requirements of the DAMA connection/QoS. The aggregate bandwidth request is used by the base stations to reset their records to reflect the current total bandwidth requirements of an associated CPE. In one embodiment, four consecutive incremental bandwidth requests are transmitted. These incremental bandwidth requests are followed by an aggregate bandwidth request. The method of the self-correcting bandwidth request/grant protocol is now described in more detail with reference to FIGS. 15a and 15b.

Figure 15A:
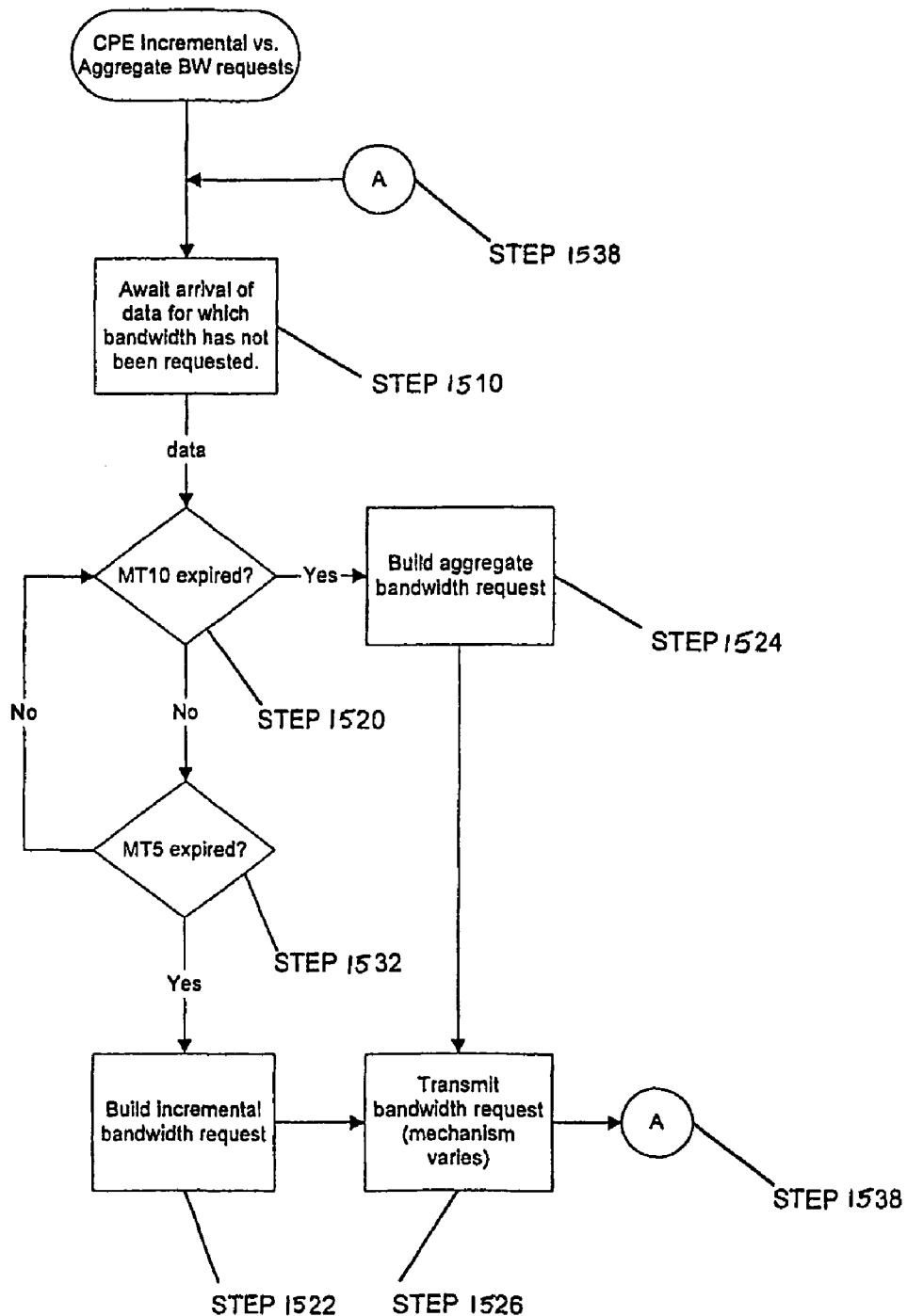
FIG. 15a is a flow diagram showing one embodiment of the self-correcting bandwidth request/grant protocol method.

FIG. 15a is a flow diagram showing one embodiment of the self-correcting bandwidth request/grant protocol 1500. As shown in FIG. 15a, the method begins at a STEP 1510 whereat the CPE waits for the arrival of data for which bandwidth has not yet been requested. When data arrives, the method proceeds to a decision STEP 1520 to determine whether a timer (referred to in FIG. 15a as the "MT10 timer") has expired. The MT10 timer is preferably a dynamic bandwidth request timer as described above. The MT10 timer is associated with the connection/QoS. The value of the MT10 timer is used to determine the number of frames that the method waits between the transmission of aggregate bandwidth requests (in other words, the MT10 timer determines the duration of the timer period between the periodic transmission of aggregate bandwidth requests). The MT10 timer can have different values for each QoS used by the system. The MT10 timer can be dynamically updated to different values depending upon current data flow and connection priority. Any bandwidth requests that are sent before the expiration of the MT10 timer are, by definition, incremental bandwidth requests. In one embodiment, the number of frames between transmission of aggregate bandwidth requests is dependent upon the QoS. In one exemplary embodiment, the MT10 timer duration equals 30 frames (for "real-time VBR" connections, or "rt-VBR"). In another exemplary embodiment, the MT10 timer duration equals 100 frames (for "non-real-time VBR" connections, or "nrt-VBR").

Referring again to FIG. 15a, if the MT10 timer is determined to have expired at STEP 1520, the method proceeds to a STEP 1524 whereat the method builds an aggregate bandwidth request. If the MT10 timer has not expired at STEP 1520, the method proceeds to a decision STEP 1532 whereat the method determines whether a second timer, referred to in FIG. 15a as an "MT5 timer", has expired. Similar to the MT10 (aggregate bandwidth request timer) described above, the MT5 timer also is preferably a dynamic bandwidth request timer. The MT5 timer is also associated with the connection/QoS. The MT5 timer is used to determine the number of frames that the method will wait for a response to a bandwidth request. As described above, bandwidth requests can be transmitted using either a "piggybacking" technique, or via individual polls. The MT5 timer measures the duration (in frames) that the method waits for a response to one of these bandwidth requests. The MT5 timer may use different values associated with different quality of services (QoS) used by the system (in other words, the duration of the MT5 timer is QoS-dependent). The timer values of the MT5 timer can be dynamically varied based upon current data flow and connection priority. In one embodiment, the method waits for duration of 10 frames (for rt-VBR). Alternatively, the method waits for duration of 20 frames (for nrt-VBR).

In one embodiment, the period counted by the MT5 timer is less than the period counted by the MT10 timer for the same QoS. If the MT5 timer is determined not to have expired at the decision STEP 1532, the method returns to the STEP 1520 to determine whether the MT10 timer has expired. However, if the MT5 timer is determined to have expired at the decision STEP 1532, the method proceeds to a STEP 1522 whereat the method builds an incremental bandwidth request. The format used in building incremental and aggregate bandwidth requests is described in more detail below with reference to Table 1.

As shown in FIG. 15a, the method proceeds to a STEP 1526 whereat the bandwidth request built at the STEP 1522 (incremental bandwidth request) or at the STEP 1524 (aggregate bandwidth request) is transmitted to a selected base station. As indicated in the notation of the STEP 1526, the mechanism used to transmit the bandwidth request can vary. Those skilled in the communications system design art shall recognize that various methods of transmitting bandwidth request messages can be used without departing from the scope or spirit of the present invention. The method proceeds to a control point (i.e., indicated in FIG. 15a by a STEP 1538) where the method returns to the STEP 1510 to await the arrival of data for which bandwidth has not been requested.

In one embodiment, the units of requested bandwidth that are indicated in the bandwidth request/grant messages are the "natural" units of the system. In a variable length packet system, the "natural" units of the system are measured in bytes and bandwidth is therefore requested using bytes as the unit of bandwidth measurement. In a fixed length packet system, the "natural" units of the system are measured in packets and bandwidth is therefore requested using packets as the unit of bandwidth measurement.

Figure 15B:
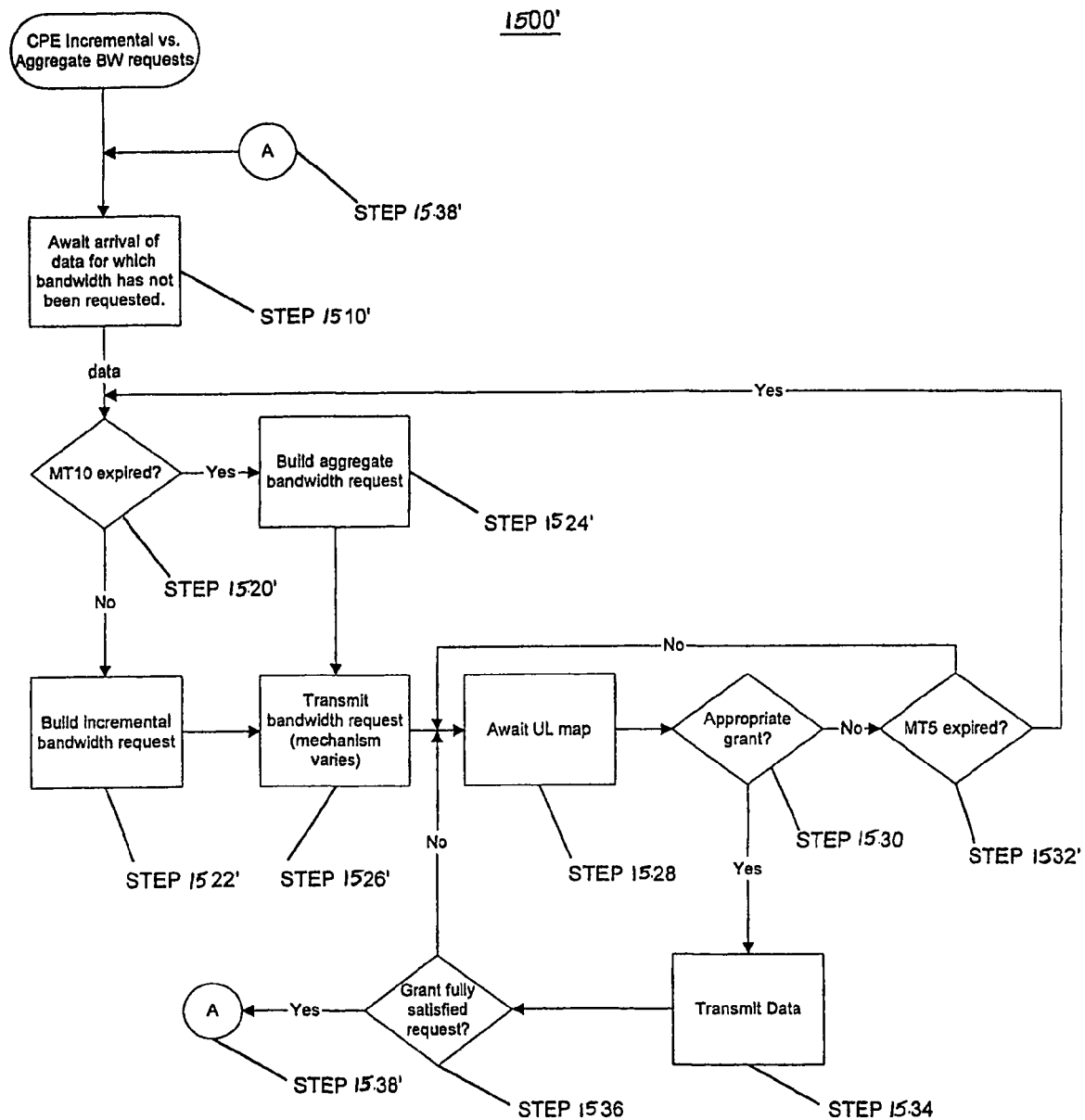
FIG. 15b is a flow diagram showing another embodiment of the self-correcting bandwidth request/grant protocol method.

FIG. 15b is a flow diagram showing an alternative embodiment of the self-correcting bandwidth request/grant protocol 1500' of the present invention. As shown in FIG. 15b, the method begins at a STEP 1510' whereat the CPE waits for the arrival of data for which bandwidth has not yet been requested. When data arrives, the method proceeds to a decision STEP 1520' to determine whether a timer (referred to in FIG. 15b as the "MT10 timer") has expired. The MT10 timer in FIG. 15b is substantially similar to the MT10 timer described above regarding FIG. 15a and thus is not described herein in more detail.

Referring again to FIG. 15b, if the MT10 timer is determined to have expired at the STEP 1520', the method proceeds to a STEP 1524' whereat the method builds an aggregate bandwidth request. If the MT10 timer is determined not to have expired at the STEP 1520', the method proceeds to a STEP 1522' whereat the method builds an incremental bandwidth request. The format used in building incremental and aggregate bandwidth requests is described in more detail below with reference to Table 1.

The method then proceeds to a STEP 1526' whereat the bandwidth request built at the STEP 1522' (incremental bandwidth request) or at the STEP 1524' (aggregate bandwidth request) is transmitted to a selected base station. The mechanism used to transmit the bandwidth request can vary. Those skilled in the communications system design art shall recognize that various methods of transmitting bandwidth request messages can be used without departing from the scope or spirit of the present invention.

The method proceeds to a STEP 1528 whereat the method waits to receive an uplink sub-frame map indicating that a bandwidth grant has been provided. The method then proceeds to a decision STEP 1530 to determine whether the bandwidth grant is appropriate for the purpose of either transmitting data or waiting for an appropriate grant. If the grant was appropriate, the method proceeds to a STEP 1534. Else, the method proceeds to a decision STEP 1532'. At the decision STEP 1532', the method determines whether a second timer, referred to in FIG. 15b as an "MT5 timer", has expired. The MT5 timer in FIG. 15b is substantially similar to the MT5 timer described above with reference to FIG. 15a and thus is not described in more detail herein.

In one embodiment, the method waits for duration of 10 frames (for rt-VBR). Alternatively, the method waits for duration of 20 frames (for nrt-VBR). In one embodiment, the period counted by the MT5 timer is less than the period counted by the MT10 timer for the same QoS. If the MT5 timer is determined to have expired at the decision STEP 1532', the method returns to the decision STEP 1520' to determine whether the MT10 timer has expired. Else, the method returns to the STEP 1528 to await receipt of an uplink Map. If the bandwidth grant was determined to be appropriate at the decision STEP 1530, the method proceeds to the STEP 1534.

As shown in FIG. 15b, at the STEP 1534, the CPE transmits data across the connection and proceeds to a decision STEP 1536 to determine whether the bandwidth grant fully satisfied the bandwidth request. If the grant fully satisfied the bandwidth request, the method proceeds to a control point (i.e., indicated in FIG. 15b by a STEP 1538') where the method returns to the STEP 1510'. Else, the method returns to the STEP 1528 where the method waits to receive an uplink sub-frame map containing a bandwidth grant from the base station. As described above with reference to FIG. 15a, in one embodiment, the units of bandwidth that are indicated in the bandwidth request/grant messages are the "natural" units of the system. In a variable length packet system, the "natural" units of the system are measured in bytes and bandwidth is therefore requested using bytes as the unit of bandwidth measurement. In a fixed length packet system, the "natural" units of the system are measured in packets and bandwidth is therefore requested using packets as the unit of bandwidth measurement.

In one embodiment, bandwidth requests from the CPE to the base station are preferably made using the following 5-byte format (summarized below in Table 1). In one embodiment, the bandwidth request comprises four fields: a "Message Type ID" field, a "Connection ID" or "QoS" field, a "Request Type" field and an "Amount Requested" field. The Message Type ID field is one byte in length and contains a hexadecimal value of "0xB0". The Connection ID (or QoS) field is two bytes in length and contains the connection ID or QoS of the connection that is requested. The contents of the Connection ID or QoS field depends upon the BW Request Scope field of a MAC Control message. The Request Type field is one bit in length and contains information indicating whether a bandwidth request is an incremental or an aggregate bandwidth request. The Request Type field is set to a logical one to indicate that the bandwidth request is an incremental request. The Request Type field is set to a logical zero to indicate that the bandwidth request is an aggregate bandwidth request. In one embodiment, the Amount Requested field is fifteen bits in length and contains either (1) the amount of bandwidth (measured in the natural units of the system) that is requested per frame for CG connections or (2) the amount of incremental/aggregate bandwidth (measured in the natural units of the system) that is requested for DAMA connections. As described above with reference to FIG. 15b, for DAMA connections, the bandwidth units are measured in bytes in variable-length packet communication systems and in packets in fixed-length packet communication systems.

TABLE 1

Exemplary Bandwidth Request Format

| Field | Size | Comments |
| --- | --- | --- |
| Message Type ID | 1 byte | Value = 0 × B0 |
| Connection ID or QoS | 2 bytes | Depends upon BW Request Scope field of MAC Control message. |
| Request Type | 1 bit | 0 = total needs for connection/QoS<br>1 = incremental needs for connection/QoS |
| Amount Requested | 15 bits | In units per frame for CG connections and total or incremental bytes pending for DAMA connections.<br>Units = bytes for variable length packet system.<br>Units = packets for fixed length packet system. |
| Total | 5 bytes | |

Abridged Bandwidth Request/Grant Protocol System

In embodiments that use an abridged bandwidth request/grant protocol system, the systems utilize padding packets to request a reduction in bandwidth allocation to a CPE. This embodiment is "abridged" because it does not require zero bandwidth request messages. The abridged bandwidth request/grant protocol system is now described in detail.

Figure 16:
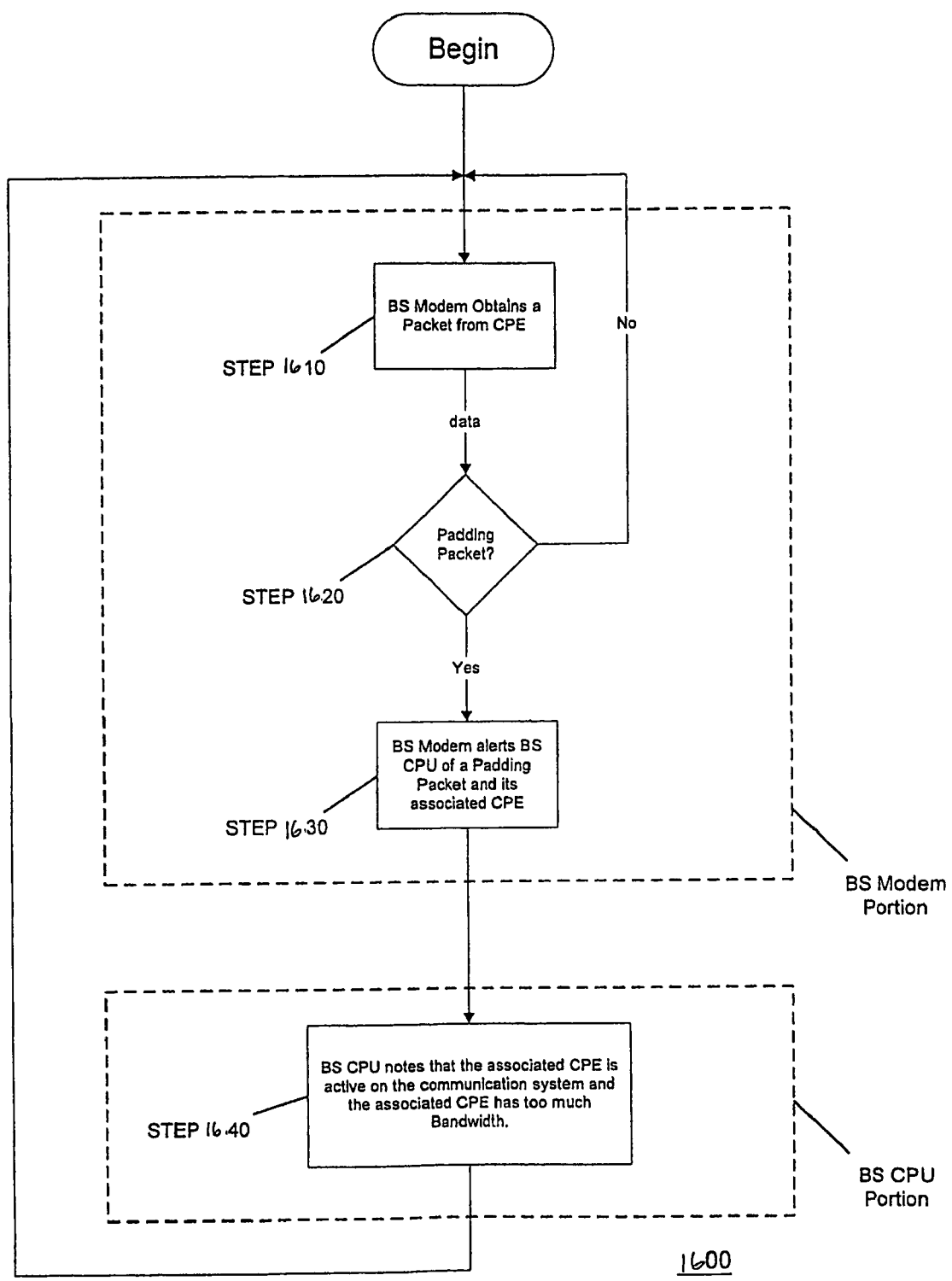
FIG. 16 shows a flowchart for one embodiment of the abridged bandwidth request/grant protocol method.

FIG. 16 shows a flowchart for the abridged bandwidth request/grant protocol system. The abridged bandwidth request/grant protocol method 1600 comprises a BS modem portion and a BS CPU portion. The BS modem portion comprises STEPs 1610-1630 and the BS CPU portion comprises STEP 1640. In accordance with one embodiment, steps within the BS modem portion (e.g., STEP 1610) are performed by the BS modem 1452. Similarly, steps within the BS CPU portion are performed by the BS CPU 1454. One skilled in the communication art shall recognize that the steps of the present inventive method may be performed in other configurations without departing from the scope or spirit of the present invention. For example, the present inventive method may perform STEP 1610 in the BS modem and STEPs 1620-1640 in the BS CPU.

Referring to FIG. 16, the method begins at a STEP 1610 whereat the BS modem obtains a packet from a CPE. The method then proceeds to a decision STEP 1620 whereat the method determines whether the packet obtained in the STEP 1610 is a padding packet. If so, the method proceeds to a STEP 1630 whereat the BS modem alerts the BS CPU of the padding packet and its associated CPE, else the method returns to the STEP 1610. In one embodiment of STEP 1630, the alert sent from the BS modem to the BS CPU comprises a flag packet comprising data identifying an associated CPE that transmitted the padding packet. One skilled in the communication art shall recognize that other means for alerting the BS CPU may be utilized without departing from the scope or spirit of the present invention. For example, a shared memory means may be utilized.

In accordance with the STEP 1630 of the present method, a BS modem identifies a CPE that has transmitted a padding packet from the transmission portion of the uplink sub-frame. One skilled in the communication art shall recognize other methods of identifying CPE's without departing from the scope or spirit of the present invention. The BS modem can identify CPEs at every uplink sub-frame or uplink scheduling interval. After the STEP 1630 the method proceeds to a STEP 1640.

As shown in FIG. 16, the BS CPU portion comprises the STEP 1640 whereat the BS CPU notes that the associated CPU is active on the communication system and has too much bandwidth. In accordance with one embodiment, the BS CPU can reduce the associated CPE's bandwidth allocation. BS CPU resets all requested bandwidth for the associated CPE. One skilled in the communication art shall recognize that other methods of reducing CPE bandwidth allocation can be utilized with this embodiment without departing from its scope or spirit. This embodiment does not require zero bandwidth request messages.

A number of embodiments have been described. Nevertheless, it will be understood that various modifications may be made without departing from the spirit and scope of the invention. For example, the method and apparatus can be used in any type of communication system. Its use is not limited to a wireless communication system. One such example is use of the invention in a satellite communication system. In such a communication system, satellites replace the base stations described above. In addition, the CPEs are no longer at fixed distances from the satellites. Therefore, it will be more difficult to schedule DAMA services for the CPEs. Alternatively, the present invention can be used in a wired communication system. The only difference between the wired system and the wireless system described above is that the channel characteristics vary between the two. However, the bandwidth allocations do not change as between the two types of systems.

Although embodiments of the self-correcting bandwidth request/grant protocol described above uses a four-one incremental bandwidth request-aggregate bandwidth request pattern (i.e., four incremental bandwidth requests are transmitted, followed by one aggregate bandwidth request), alternative incremental/aggregate bandwidth request patterns can be used without departing from the scope or spirit of the present invention. For example, in one alternative embodiment, three incremental bandwidth requests are transmitted followed by one aggregate bandwidth request. Another alternative uses a 3-to-2 incremental-to-aggregate bandwidth request transmission pattern. Accordingly, it is to be understood that the invention is not to be limited by the specific illustrated embodiment, but only by the scope of the appended claims.

The invention claimed is:

1. A method for allocating bandwidth in a broadband wireless communication system, wherein the wireless communication system includes a plurality of Customer Premise Equipment in communication with associated base stations, and wherein the base stations maintain uplink and downlink sub-frame maps representative of the bandwidth allocations in the uplink and downlink communication paths, the method comprising:

(a) determining an incremental bandwidth requirement for a selected Customer Premises Equipment;
   (b) transmitting an incremental bandwidth request to a base station that is associated with the selected Customer Premises Equipment, wherein the incremental bandwidth request contains information indicative of the incremental bandwidth requirement determined in step (a);
   (c) determining an aggregate bandwidth requirement for the selected Customer Premises Equipment;
   (d) determining whether an aggregate bandwidth request should be transmitted to the base station associated with the selected Customer Premises Equipment such that an aggregate bandwidth request is sent periodically, wherein the aggregate bandwidth request contains information indicative of the aggregate bandwidth requirement determined in step (c);
   (e) if the aggregate bandwidth request is determined to be required in step (d), transmitting the aggregate bandwidth request to the associated base station and returning to step (a), else returning to step (a) without transmitting the aggregate bandwidth request;
   (f) obtaining a packet from an associated Customer Premises Equipment;
   (g) determining whether the packet of step (f) is a padding packet;
   (h) if the packet is a padding packet, alerting a base station CPU of the padding packet, else returning to step (f);
   (i) reducing a bandwidth allocation of the associated Customer Premises Equipment; and
   (j) returning to step (f).

2. The method for allocating bandwidth as defined in claim 1, wherein the incremental bandwidth requirement comprises the change in bandwidth requirements since the selected Customer Premises Equipment last requested bandwidth from the associated base station.

3. The method for allocating bandwidth as defined in claim 1, wherein the aggregate bandwidth requirement determined in step (c) comprises a total immediate bandwidth requirement for the selected Customer Premises Equipment.

4. The method for allocating bandwidth as defined in claim 1, wherein the step (d) of determining whether an aggregate bandwidth request should be transmitted to the associated base station comprises:
   (a) counting consecutive transmissions of incremental bandwidth requests;
   (b) comparing the number of consecutive transmissions counted in step (a) to a pre-determined incremental bandwidth request threshold value; and
   (c) indicating that an aggregate bandwidth request is required if the number of consecutive transmissions of incremental bandwidth requests equals the pre-determined threshold, else returning to step (a).

5. The method for allocating bandwidth as defined in claim 1, wherein the step (d) of determining whether an aggregate bandwidth request should be transmitted to the associated base station comprises:
   (a) waiting a pre-determined time interval between transmissions of aggregate bandwidth requests;
   (b) indicating that an aggregate bandwidth request is required when the pre-determined time interval has expired, else returning to step (a).

6. The method for allocating bandwidth as defined in claim 1, wherein step (e) further comprises resetting records representative of the total bandwidth requirements of the selected Customer Premises Equipment, at the associated base station in response to the transmitted aggregate bandwidth request.

7. The method for allocating bandwidth as defined in claim 1, wherein the incremental and aggregate bandwidth requests are transmitted by the selected Customer Premises Equipment to the associated base station using a piggybacking technique, wherein the selected Customer Premises Equipment transmits the bandwidth requests using unused bandwidth in packets of existing bandwidth allocations.

8. The method for allocating bandwidth as defined in claim 1, wherein the incremental and aggregate bandwidth requests are transmitted by the selected Customer Premises Equipment to the associated base station using an individual polling technique, wherein the selected Customer Premises Equipment is individually polled by the associated base station for its bandwidth requirements.

9. The method for allocating bandwidth as defined in claim 8, wherein the associated base station allocates bandwidth to the selected Customer Premises Equipment in an uplink sub-frame map, and wherein the base station determines whether the selected Customer Premises Equipment requests polling by setting a poll-me bit associated with the selected Customer Premises Equipment.

10. The method for allocating bandwidth as defined in claim 1, wherein bandwidth requests are transmitted to the associated base station using a bandwidth request message.

11. The method for allocating bandwidth as defined in claim 10, wherein the bandwidth request message includes a Message Type ID field, a Connection ID/Quality of Service field, a Request Type field, and an Amount Requested field.

12. The method for allocating bandwidth as defined in claim 11, wherein the Request Type field indicates whether an incremental or an aggregate bandwidth request is being transmitted.

13. The method for allocating bandwidth as defined in claim 11, wherein the Amount Requested field indicates the amount of bandwidth being requested by the selected Customer Premises Equipment.

14. The method for allocating bandwidth as defined in claim 13, wherein the amount of bandwidth being requested is expressed in bytes.

15. The method for allocating bandwidth as defined in claim 13, wherein the amount of bandwidth being requested is expressed in packets.

16. The method for allocating bandwidth as defined in claim 11, wherein the Message Type ID field comprises a pre-determined constant value indicating to the communication system that a bandwidth request message is being transmitted.

17. The method for allocating bandwidth as defined in claim 11, wherein the Connection ID/Quality of Service field indicates either an identifier for a connection between the selected Customer Premises Equipment and the associated base station, or a quality of service associated with the connection between the selected Customer Premises Equipment and the associated base station.

18. The method for allocating bandwidth as defined in claim 17, wherein the quality of service associated with the connection is assigned at a time when the connection is first established between the Customer Premises Equipment and the associated base station.

19. The method for allocating bandwidth of claim 1 wherein the step (h) of alerting a base station CPU comprises transmitting a flag packet to the base station CPU.

20. The method for allocating bandwidth of claim 19 wherein the flag packet comprises information regarding an associated CPU.

21. The method for allocating bandwidth of claim 1 wherein the step (h) of alerting a base station CPU uses a shared memory processor.

22. The method for allocating bandwidth of claim 1 wherein
   the obtaining a packet step (f), the determining whether the packet step (g) and the alerting a base station CPU step (h) are performed by a base station modem and
   the reducing a bandwidth allocation step (i) is performed by a base station CPU.

23. The method for allocating bandwidth of claim 1 wherein
   the obtaining a packet step (f) is performed by a base station modem and
   the determining whether the packet step (g), the if the packet is a padding packet, alerting a base station CPU step (h) and the reducing a bandwidth allocation step (i) are performed by a base station CPU.

24. The method for allocating bandwidth of claim 1 wherein the step (i) of reducing a bandwidth allocation comprises resetting all requested bandwidth for the associated Customer Premises Equipment.

25. A broadband wireless communication system, wherein the wireless communication system includes one or more of Customer Premise Equipment in communication with an associated base station, and wherein the base station maintains uplink and downlink sub-frame maps representative of the bandwidth allocations in the uplink and downlink communications paths, the system comprising:
   (a) bandwidth requirement calculating means for calculating an incremental bandwidth requirement and an aggregate bandwidth requirement of a selected Customer Premises Equipment;
   (b) transmitting means, operatively coupled to the bandwidth requirement calculating means, for transmitting an incremental bandwidth request and an aggregate bandwidth request to a base station associated with the selected Customer Premises Equipment, wherein the incremental bandwidth request is indicative of the incremental bandwidth requirement of the selected Customer Premises Equipment, and wherein the aggregate bandwidth request is indicative of the aggregate bandwidth requirement of the selected Customer Premises Equipment;

(c) determining means, operatively coupled to the transmitting means, for determining whether the aggregate bandwidth request should be transmitted to the associated base station, wherein the determining means causes the transmitting means to periodically transmit the aggregate bandwidth request;

(d) packet obtaining means for obtaining a packet from an associated Customer Premises Equipment;

(e) packet determining means, coupled to the packet obtaining means, for determining whether a packet is a padding packet;

(f) base station CPU alerting means, coupled to the packet determining means, for alerting a base station CPU of a padding packet; and (g) bandwidth allocation reducing means, coupled to the base station CPU alerting means, for reducing a bandwidth allocation of the associated Customer Premises Equipment.

26. The system as defined in claim 25, wherein the incremental bandwidth requirement comprises the change in bandwidth requirements since the selected Customer Premises Equipment last requested bandwidth from the associated base station.

27. The system as defined in claim 25, wherein the aggregate bandwidth requirement comprises a total immediate bandwidth requirement for the selected Customer Premises Equipment.

28. The system as defined in claim 25, wherein the means for determining whether an aggregate bandwidth request should be transmitted to the associated base station comprises:

(a) means for counting consecutive transmissions of incremental bandwidth requests;

(b) means for comparing the number of consecutive transmissions counted by the counting means with a pre-determined incremental bandwidth request threshold value; and (c) means for indicating that an aggregate bandwidth request is required whenever the number of consecutive transmissions of incremental bandwidth requests equals the pre-determined threshold.

29. The system as defined in claim 28, wherein the means for counting consecutive transmissions of incremental bandwidth requests includes a dynamic timer.

30. The system as defined in claim 29, wherein the timer is set to a pre-determined number of frames that the apparatus waits between transmissions of aggregate bandwidth requests, and wherein the time in decremented each time that an incremental bandwidth request is transmitted.

31. The system as defined in claim 30, wherein the pre-determined number of frames that the apparatus waits between transmissions of aggregate bandwidth requests depends upon a quality of service associated with a connection between the Customer Premises Equipment and the associated base station.

32. The system as defined in claim 25, wherein a base station modem comprises the packet obtaining means, the packet determining means and the base station CPU alerting means and wherein a base station CPU comprises the bandwidth allocation reducing means.

33. The system as defined in claim 25, wherein a base station modem comprises the packet obtaining means and wherein a base station CPU comprises the packet determining means, the base station CPU alerting means and the bandwidth allocation reducing means.

* * * * *

UNITED STATES PATENT AND TRADEMARK OFFICE
CERTIFICATE OF CORRECTION

PATENT NO. : 7,529,193 B2
APPLICATION NO. : 10/978903
DATED : May 5, 2009
INVENTOR(S) : Ofer Zimmerman et al.

It is certified that error appears in the above-identified patent and that said Letters Patent is hereby corrected as shown below:

On the Title page of the patent, at Item (63), after "6,925,068." insert, --This application is also a continuation-in-part of application serial no. 10/848,470, filed May 17, 2004 (now U.S. Patent No. 7,548,534), which is a continuation of application serial no. 09/613,434, filed July 11, 2000 (now U.S. Patent No. 6,785,252), which is a continuation-in-part of application serial no. 09/316,518, filed May 21, 1999 (now U.S. Patent No. 6,925,068).--

At Column 1, Line 20, insert --This application is also a continuation-in-part of application serial no. 10/848,470, filed May 17, 2004 (now U.S. Patent No. 7,548,534), which is a continuation of application serial no. 09/613,434, filed July 11, 2000 (now U.S. Patent No. 6,785,252), which is a continuation-in-part of application serial no. 09/316,518, filed May 21, 1999 (now U.S. Patent No. 6,925,068).--

Signed and Sealed this
Thirty-first Day of July, 2012

David J. Kappos
*Director of the United States Patent and Trademark Office*